US009013402B2

(12) United States Patent
Munekata

(10) Patent No.: US 9,013,402 B2
(45) Date of Patent: Apr. 21, 2015

(54) INFORMATION PROCESSING DEVICE, INFORMATION PROCESSING METHOD, AND PROGRAM

(75) Inventor: Kazumi Munekata, Tokyo (JP)

(73) Assignee: Sony Corporation, Tokyo (JP)

( * ) Notice: Subject to any disclaimer, the term of this patent is extended or adjusted under 35 U.S.C. 154(b) by 121 days.

(21) Appl. No.: 13/226,966

(22) Filed: Sep. 7, 2011

(65) Prior Publication Data

US 2012/0062456 A1  Mar. 15, 2012

(30) Foreign Application Priority Data

Sep. 14, 2010  (JP) ................................. 2010-205311

(51) Int. Cl.
  *G09G 5/08* (2006.01)
  *G06F 3/03* (2006.01)
  *G06F 3/01* (2006.01)
  *G06F 3/038* (2013.01)

(52) U.S. Cl.
  CPC .............. *G06F 3/0304* (2013.01); *G06F 3/017* (2013.01); *G06F 3/038* (2013.01)

(58) Field of Classification Search
  None
  See application file for complete search history.

(56) References Cited

U.S. PATENT DOCUMENTS

| | | | | |
|---|---|---|---|---|
| 6,948,127 | B1* | 9/2005 | Zhu et al. | 715/719 |
| 8,107,706 | B2* | 1/2012 | Saijo | 382/128 |
| 2004/0178995 | A1* | 9/2004 | Sterling | 345/173 |
| 2006/0028446 | A1* | 2/2006 | Liberty et al. | 345/158 |
| 2007/0060385 | A1* | 3/2007 | Dohta | 463/43 |
| 2010/0079411 | A1* | 4/2010 | Lee et al. | 345/175 |
| 2010/0295781 | A1* | 11/2010 | Alameh et al. | 345/158 |

FOREIGN PATENT DOCUMENTS

| | | |
|---|---|---|
| JP | 5-329163 | 12/1993 |
| JP | 6-123700 | 5/1994 |
| JP | 2006-47067 | 2/2006 |
| JP | 2008-27242 | 2/2008 |

* cited by examiner

*Primary Examiner* — Temesgh Ghebretinsae
*Assistant Examiner* — Paras D Karki
(74) *Attorney, Agent, or Firm* — K&L Gates LLP

(57) ABSTRACT

An information processing device includes: a user position detection unit that detects a user position indicating a position of a user indicated by a plurality of values on different coordinate axes; a calculation unit that calculates user movement information indicating a movement of the user based on a coordinate point defined by a value on at least one axis among the plurality of values on coordinate axes indicating the user position; a setting unit that sets a process to be executed among a plurality of processes performed according to a movement of the user based on the calculated user movement information; and an execution unit that executes the set process.

15 Claims, 15 Drawing Sheets

INFORMATION PROCESSING DEVICE, INFORMATION PROCESSING METHOD, AND PROGRAM

CROSS REFERENCES TO RELATED APPLICATIONS

The present application claims priority to Japanese Priority Patent Application JP 2010-205311 filed in the Japan Patent Office on Sep. 14, 2010, the entire content of which is hereby incorporated by reference.

BACKGROUND

The present application relates to an information processing device, an information processing method, and a program, and more particularly to an information processing device, an information processing method, and a program, capable of correctly executing a process which a user intends to perform based on, for example, a movement of the hand of the user.

There is a skin detection technique in which a region where skin is exposed such as the face or the hand of a user (hereinafter, referred to as a skin region) is detected from a captured image obtained by imaging the user (for example, refer to JP-A-2006-47067, JP-A-06-123700, JP-A-05-329163, and JP-A-2008-27242).

In this skin detection technique, a difference between a luminance value of a first image obtained by imaging a subject (user) which is irradiated with light of a wavelength $\lambda 1$ and a luminance value of a second image obtained by imaging the subject which is irradiated with light of a wavelength $\lambda 2$ different from the wavelength $\lambda 1$, is obtained, and a region in which the difference is greater than a predetermined threshold value is detected as a skin region.

In addition, the wavelengths $\lambda 1$ and $\lambda 2$ are set depending on the reflection characteristic of human skin. That is to say, the wavelengths $\lambda 1$ and $\lambda 2$ are set as such values that the reflectance is different when human skin is irradiated and the reflectance is approximately the same when things other than human skin (for example, hair, clothes, and the like) are irradiated. Specifically, for example, the wavelength $\lambda 1$ is 850 nm, and the wavelength $\lambda 2$ is 970 nm.

Further, in the skin detection technique, a three-dimensional position (x, y, z) of the hand of the user or the like corresponding to the skin region is detected based on the detected skin region. In addition, a pointer movement process of moving a pointer on a display, or a click detection process of detecting a click operation at a position where the pointer is present, is performed based on the detected three-dimensional position (x, y, z).

SUMMARY

However, in the case of detecting the three-dimensional position (x, y, z) of the hand or the like of the user based on the skin region as in the skin detection technique, there is a case where the detected three-dimensional position (x, y, z) is greatly varied depending on the detection accuracy of the detected three-dimensional position (x, y, z).

Specifically, for example, even if the user moves the hand only in the X and Y directions (the horizontal direction and the vertical direction with respect to the user) in order to move the pointer on the display, z as well as x and y may be also greatly varied in the three-dimensional position (x, y, z).

In this case, as a process which the user intends to perform, a pointer movement process of moving the pointer on the display is performed, and, as a process which the user does not intend to perform, a click detection process of detecting a click operation is performed so as to correspond to the movement of the hand of the user in the Z direction.

Further, for example, even if the user moves the hand only in the Z direction (the front-back direction with respect to the user) in order to perform a click operation at a predetermined position after the user moves the pointer to the predetermined position, x and y as well as z may be also greatly varied in the detected three-dimensional position (x, y, z).

In this case, there is a case where a click detection process is performed as a process which the user intends to perform, and further a pointer movement process is also performed as a process which the user does not intend to perform.

Thus, it is desirable to correctly execute a process which a user intends to perform according to a movement of the user.

An embodiment is directed to an information processing device including a user position detection unit that detects a user position indicating a position of a user indicated by a plurality of values on different coordinate axes; a calculation unit that calculates user movement information indicating a movement of the user based on a coordinate point defined by a value on at least one axis among the plurality of values on coordinate axes indicating the user position; a setting unit that sets a process to be executed among a plurality of processes performed according to a movement of the user based on the calculated user movement information; and an execution unit that executes the set process.

The calculation unit may calculate at least one of a movement quantity of the coordinate point within a predetermined time, a movement direction of the coordinate point, a movement velocity of the coordinate point, and a curvature of a trajectory drawn by the coordinate point, as the user movement information.

The information processing device may further include a first irradiation unit that irradiates the user with light of a first wavelength; a second irradiation unit that irradiates the user with light of a second wavelength longer than the first wavelength; a captured image generation unit that generates a first image based on reflection light from the user, incident when the light of the first wavelength is applied, and generates a second image based on reflection light from the user, incident when the light of the second wavelength is applied; and a skin region detection unit that detects a skin region indicating skin of the user based on the generated first and second images. Here, the user position detection unit may detect the user position based on the skin region.

The information processing device may further include a display control unit that displays a pointer which is moved according to a movement of the user.

The display control unit may display at least one of the user movement information, a process set by the setting unit, a detection result by the user position detection unit, a detection result by the skin region detection unit, and pointer movement information indicating a movement of the pointer.

The display control unit may display at least one of the plurality of values on coordinate axes indicating the detected user position, as the detection result by the user position detection unit.

The display control unit may display at least one of information indicating a direction in which the pointer is moved, and information indicating a trajectory of the pointer, as the pointer movement information.

The information processing device may further include a data determination unit that determines whether or not the detected user position is abnormal data, and, here, the calculation unit may calculate the user movement information based on a coordinate point defined by a value on at least one axis among the plurality of values on coordinate axes indicating the user position which is determined as not being abnormal data among a plurality of detected user positions.

The user position detection unit may detect a three-dimensional position indicated by values on three different coordinate axes as the user position. In addition, the calculation unit may calculate first user movement information based on a first coordinate point defined by values on two coordinate axes of the three coordinate axes, and calculate second user movement information different from the first user movement information based on a second coordinate point defined by a value on the remaining coordinate axis of the three coordinate axes.

The setting unit may set, as a process to be executed according to a movement of the user, one of: a pointer mode process of moving a pointer displayed on a display unit; a click mode process of detecting a click operation by which the user instructs selection or execution; a rotation mode process of performing a process corresponding to a circular trajectory so as to correspond to a movement of the pointer which draws the circular trajectory; and a line mode process of performing a process corresponding to a linear trajectory so as to correspond to a movement of the pointer which draws the linear trajectory.

Another embodiment is directed to an information processing method of an information processing device which executes a process according to a movement of a user, the information processing device including a user position detection unit, a calculation unit, a setting unit, and an execution unit, the method including causing the user position detection unit to detect a user position indicating a position of a user indicated by a plurality of values on different coordinate axes; causing the calculation unit to calculate user movement information indicating a movement of the user based on a coordinate point defined by a value on at least one axis among the plurality of values on coordinate axes indicating the user position; causing the setting unit to set a process to be executed among a plurality of processes performed according to a movement of the user based on the calculated user movement information; and causing the execution unit to execute the set process.

Still another embodiment is directed to a program enabling a computer to function as a user position detection unit that detects a user position indicating a position of a user indicated by a plurality of values on different coordinate axes; a calculation unit that calculates user movement information indicating a movement of the user based on a coordinate point defined by a value on at least one axis among the plurality of values on coordinate axes indicating the user position; a setting unit that sets a process to be executed among a plurality of processes performed according to a movement of the user based on the calculated user movement information; and an execution unit that executes the set process.

According to the embodiments of the present disclosure, a user position indicating a position of a user indicated by a plurality of values on different coordinate axes is detected, user movement information indicating a movement of the user is calculated based on a coordinate point defined by a value on at least one axis among the plurality of values on coordinate axes indicating the user position, a process to be executed among a plurality of processes performed according to a movement of the user is set based on the calculated user movement information, and the set process is executed.

It is possible to correctly execute a process which a user intends to perform according to a movement of the user.

Additional features and advantages are described herein, and will be apparent from the following Detailed Description and the figures.

DETAILED DESCRIPTION

Embodiments of the present application will be described below in detail with reference to the drawings.

1. Embodiment (an example of a case of selecting one process to be executed according to a three-dimensional position of a user)

2. Modified Example

1. Embodiment

Configuration Example of Detection Device

Figure 1:
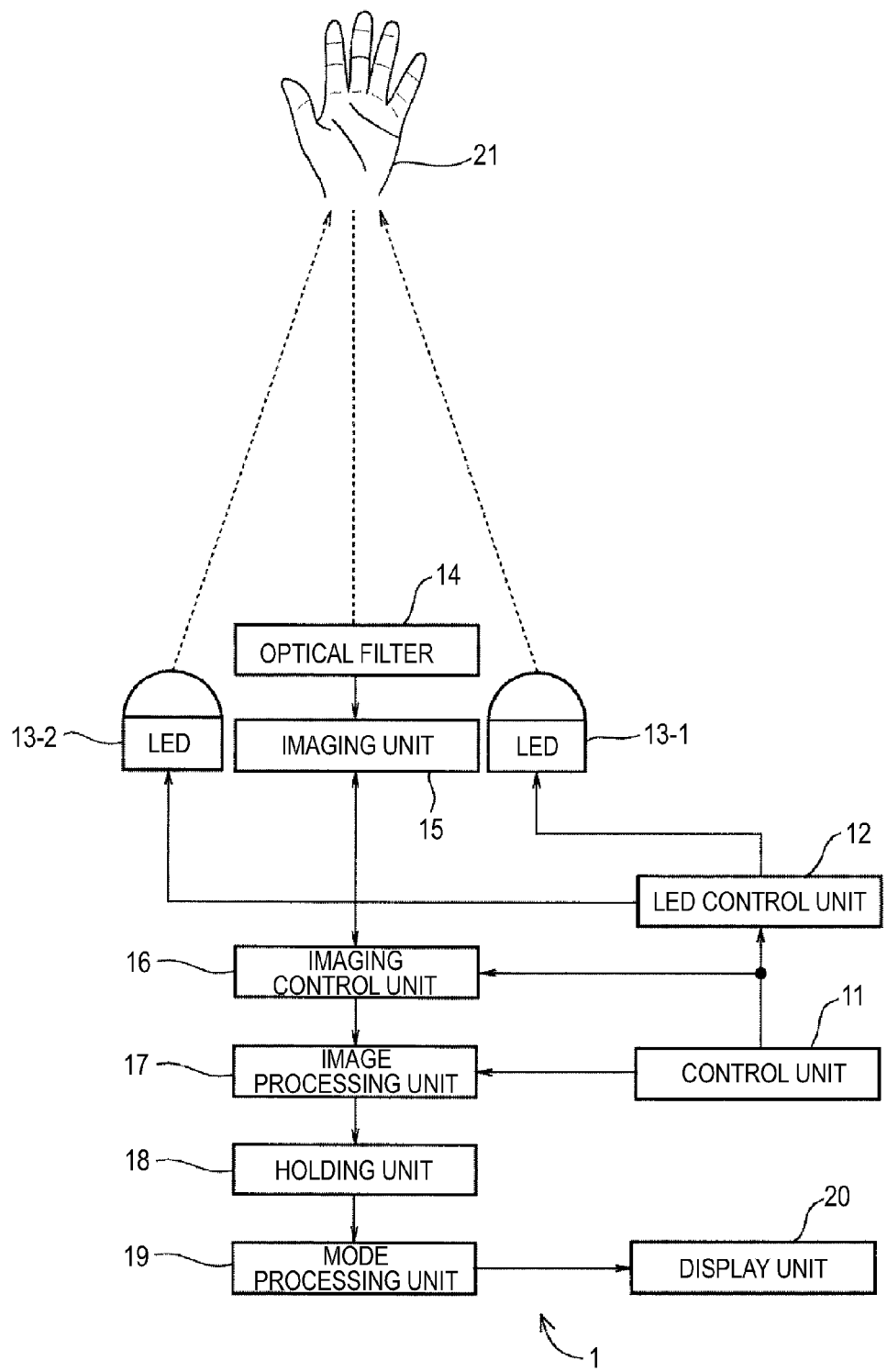
FIG. 1 is a block diagram illustrating a configuration example of a detection device according to an embodiment.

FIG. 1 shows a configuration example of a detection device 1 according to the embodiment. The detection device 1 detects a human skin region (for example, face, hand, or the like) which is a detection target 21 from a captured image. The detection device 1 performs a movement of a pointer 61 shown in FIGS. 2 and 3, described later, detection of a click operation by which a user instructs selection or execution, or the like.

The detection device 1 includes a control unit 11, an LED (Light Emitting Diode) control unit 12, an LED 13-1, an LED 13-2, an optical filter 14, an imaging unit 15, an imaging control unit 16, an image processing unit 17, a holding unit 18, a mode processing unit 19, and a display unit 20.

The control unit 11 collectively controls operations of the respective parts of the detection device 1. The LED control unit 12 controls turned-on timings, turned-off timings, and an output level of the LED 13-1 and the LED 13-2 in response to the control from the control unit 11. The LED 13-1 emits light having a peak wavelength of $\lambda 1$ in an emission spectrum (hereinafter, light of the wavelength λ1) in response to the control from the LED control unit 12. The LED 13-2 emits light having a peak wavelength of λ2 in an emission spectrum (hereinafter, light of the wavelength λ2) in response to the control from the LED control unit 12.

In addition, values of the wavelengths λ1 and λ2 are set depending on the reflection characteristic of human skin. That is to say, the wavelengths λ1 and λ2 are set as such values that the reflectance is different when human skin is irradiated and the reflectance is approximately the same when things other than human skin (for example, hair, clothes, and the like) are irradiated.

Specifically, for example, a value of the wavelength λ1 is regarded as 640 nm to 1000 nm, and a value of the wavelength λ2 longer than the wavelength λ1 is regarded as 900 nm to 1100 nm.

The optical filter 14 is provided on the front surface of the imaging unit 15 so as to limit light incident to the imaging unit 15, and has the spectral characteristic that transmits light from a first wavelength to a second wavelength therethrough and absorbs (blocks) light other than that.

The first wavelength and the second wavelength are set according to values of the wavelength λ1 and the wavelength λ2 such that the optical filter 14 transmits the light of the wavelength λ1 and the light of the wavelength λ2 therethrough.

The imaging unit 15 embeds a condensing lens (a condensing lens 71 in FIGS. 4 and 5) and imaging elements such as a CCD, and a CMOS therein, and senses light (reflection light from a subject) which is transmitted through the optical filter 14 in response to the control from the imaging control unit 16, thereby generating an image. It is assumed that a first image is an image generated when the LED 13-1 emits the light of the wavelength λ1, and a second image is an image generated when the LED 13-2 emits the light of the wavelength λ2.

The imaging control unit 16 controls imaging timings, a gain of luminance amplification, and the like of the imaging unit 15 in response to the control from the control unit 11. In addition, the imaging control unit 16 outputs the first and second images generated by the imaging unit 15 to the image processing unit 17.

The image processing unit 17 detects a skin region of a subject based on the first and second images. In addition, the image processing unit 17 calculates a three-dimensional position $(x, y, z)_t$ of the subject based on the detected skin region, and supplies the three-dimensional position to the holding unit 18 so as to be stored. Here, the three-dimensional position $(x, y, z)_t$ indicates a three-dimensional position $(x, y, z)$ calculated in the t-th calculation order. The three-dimensional position $(x, y, z)$ is defined, for example, on XYZ coordinate axes which have an optical direction of the condensing lens of the imaging unit 15 as the Z axis, the horizontal direction of the imaging unit 15 as the X axis, and the vertical direction of the imaging unit 15 as the Y axis.

In addition, the image processing unit 17 performs a conversion process using a predetermined conversion equation for the three-dimensional position $(x, y, z)_t$ when supplying the three-dimensional position $(x, y, z)_t$ to the holding unit 18 so as to be stored. Details of the conversion process will be described later with reference to FIGS. 4 and 5.

The holding unit 18 holds (stores) the latest three-dimensional position $(x, y, z)t$ calculated by the image processing unit 17 and focus information indicating whether or not an icon displayed on the display unit 20 is focused (selected). In addition, it is assumed that the holding unit 18 stores, for example, ten or more latest calculated three-dimensional positions $(x, y, z)$ as the three-dimensional position $(x, y, z)t$ of the subject.

The mode processing unit 19 executes several processes, that is, a click mode process of determining whether or not a click operation is performed by a user, a rotation mode process of sequentially changing icons to be focused according to a movement of the pointer 61, and a pointer mode process of moving the pointer 61, based on the three-dimensional position $(x, y, z)t$ of the subject stored in the holding unit 18.

Figure 2:
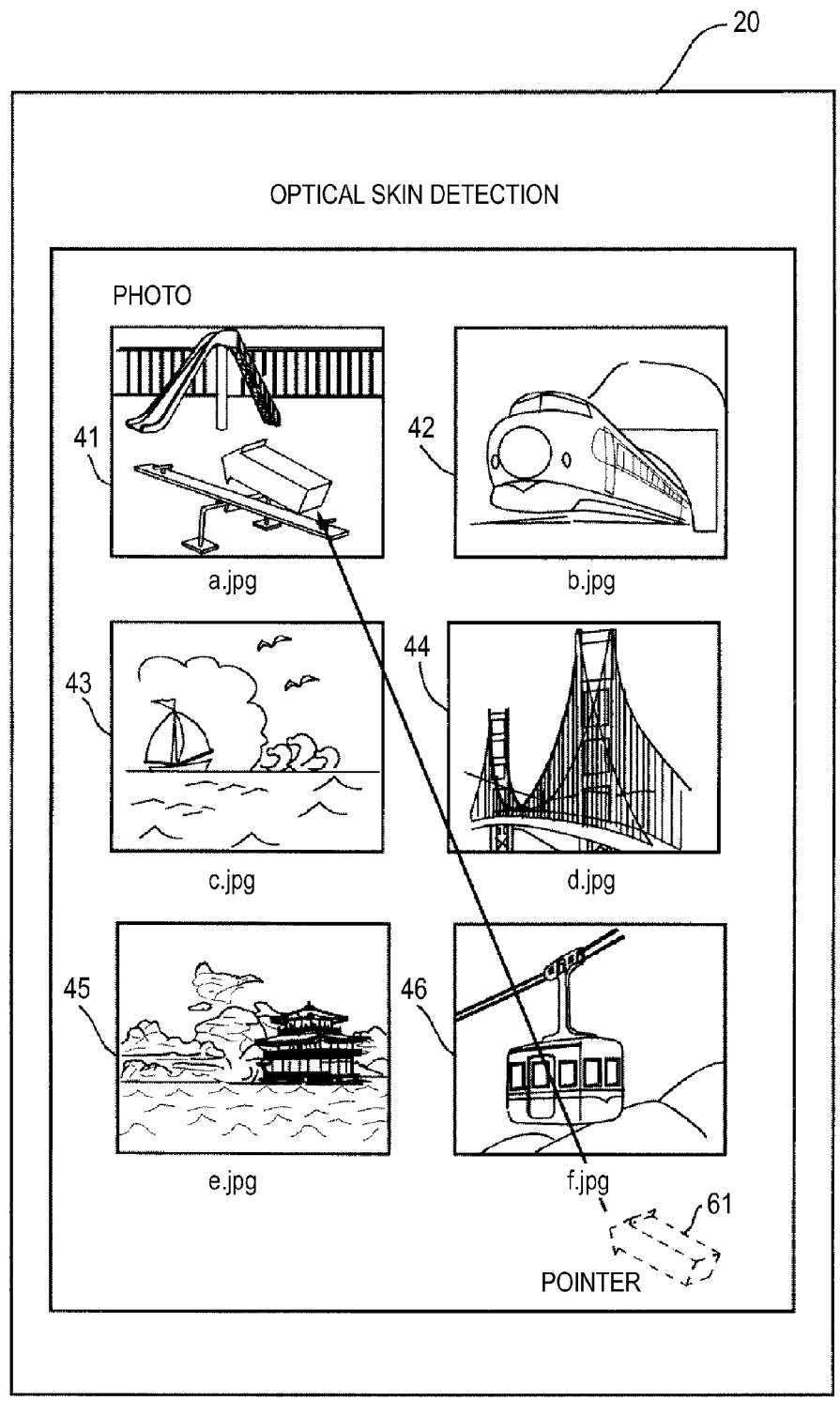
FIG. 2 is a first diagram illustrating a display example in a display unit.
Figure 3:
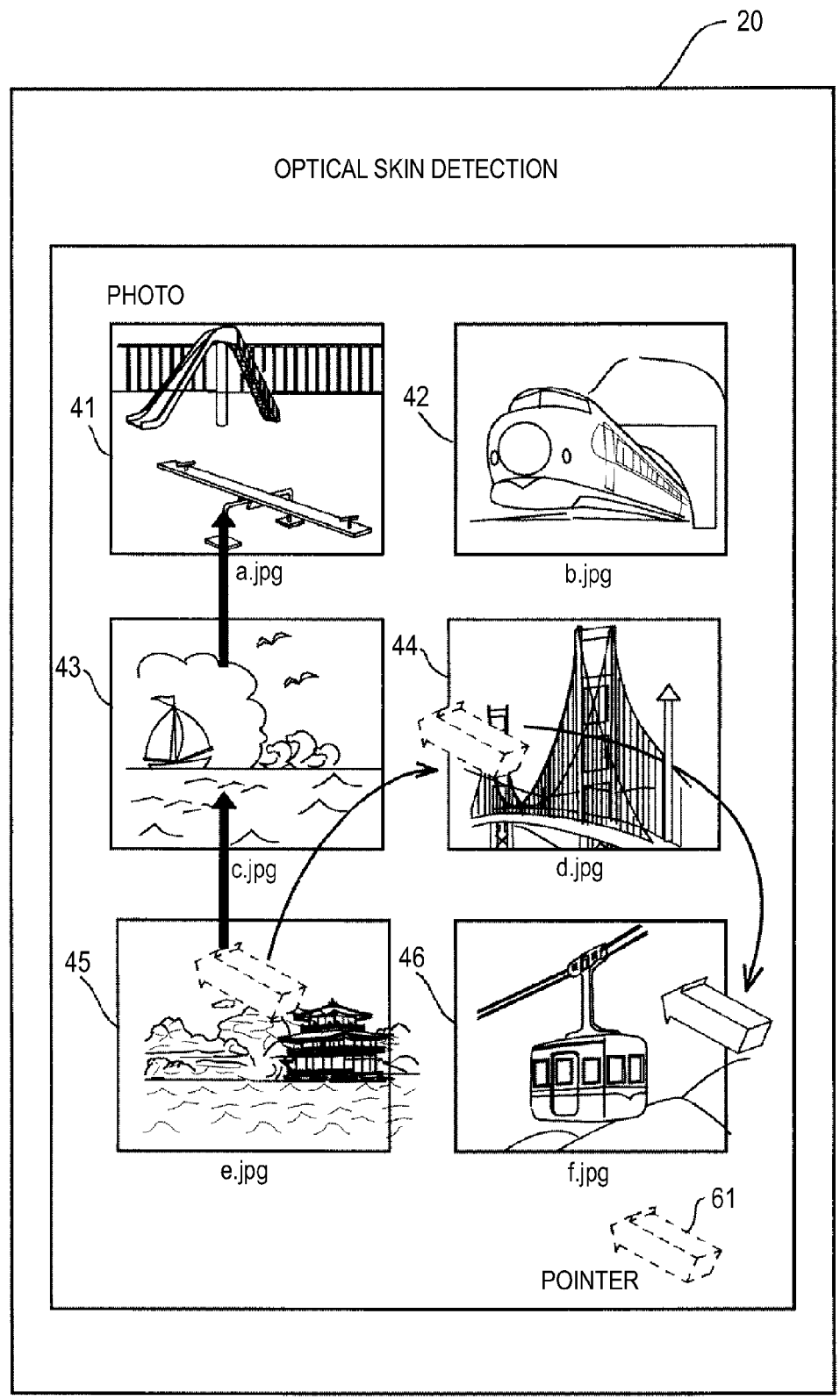
FIG. 3 is a second diagram illustrating a display example in the display unit.

The display unit 20 displays such images as shown in FIG. 2 or 3 in response to the control from the mode processing unit 19.

First Display Example in Display Unit 20

FIG. 2 shows an example of a display example of the display unit 20 when the pointer mode process is performed by the mode processing unit 19.

FIG. 2 shows icons 41 to 46 which respectively indicate six pieces of image data.

In a case of performing the pointer mode process, the mode processing unit 19 moves the pointer 61 to a position on the display screen of the display unit 20, corresponding to the latest calculated three-dimensional position $(x, y, z)_t$ among the three-dimensional positions $(x, y, z)_t$ of the subject stored in the holding unit 18.

Specifically, for example, when a user moves the hand of the user from the bottom right to the top left in order to move the pointer 61 denoted with the dotted lines to a position on the icon 41, in front of the imaging unit 15 of the detection device 1, the mode processing unit 19 moves the pointer 61 from the bottom right position in the display screen of the display unit 20 to the position on the icon 41 so as to correspond to the movement of the user.

Second Display Example in Display Unit 20

Next, FIG. 3 shows an example of a display screen of the display unit 20 when the rotation mode process is performed by the mode processing unit 19.

In a case of performing the rotation mode process, the mode processing unit 19 determines whether or not the pointer 61 is moved to draw a circle in the clockwise rotation (right rotation) or to draw a circle in the counterclockwise rotation (left rotation) based on the three-dimensional positions $(x, y, z)$ of the subject held in the holding unit 18.

In addition, the mode processing unit 19, as shown in FIG. 3, selects a new icon in the clockwise rotation each time it is determined that the pointer 61 is moved to draw a circle in the clockwise rotation.

Specifically, for example, in a case where the icon 41 is selected at present, if it is determined that the pointer 61 is moved to draw a circle in the clockwise rotation, the mode processing unit 19 changes the selected icon from the icon 41 to the icon 42 adjacent to the icon 41 in the right direction.

If it is determined that the pointer 61 is moved to draw a circle in the counterclockwise rotation, the mode processing unit 19 selects a new icon in the counterclockwise direction.

In response to the user moving the hand or the like so as to draw a circle, as shown in FIG. 3, the detection device 1 moves the pointer 61 on the display screen of the display unit 20 in the same manner.

Figure 4:
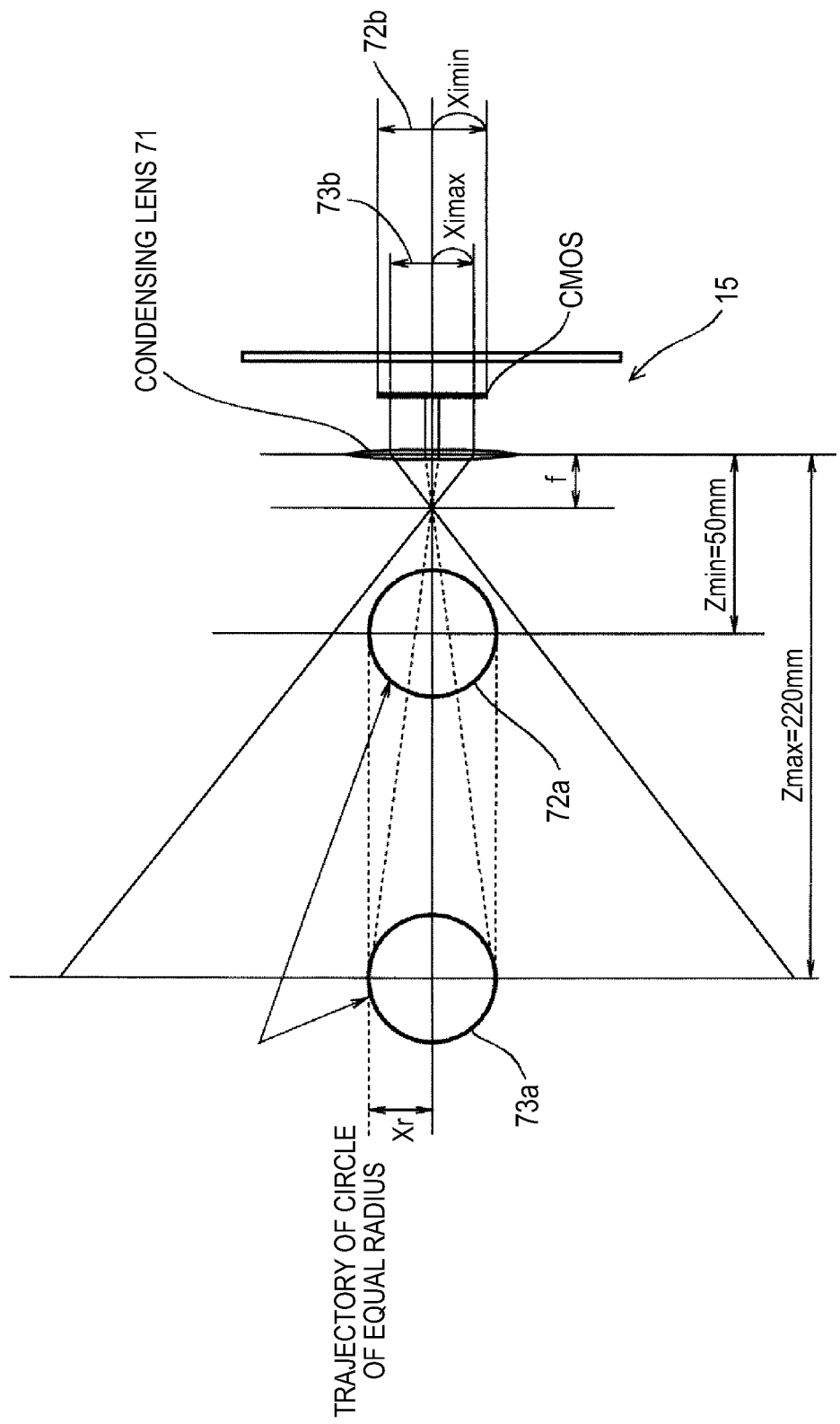
FIG. 4 is a diagram illustrating a case where circular trajectories drawn by a pointer are different from each other depending on a distance between the hand of a user and a condensing lens of an imaging unit.

However, as shown in FIG. 4, although the hand of the user is moved to draw circles of the same radius Xr regardless of a distance between the condensing lens 71 of the imaging unit 15 and the hand of the user, circular trajectories (particularly, radii of the circles) drawn by the pointer 61 differ from each other depending on the distance.

That is to say, for example, if the hand of the user is moved to draw a circular trajectory 72a of the radius Xr at the short distance $z_{min}$ (for example, the distance 50 mm shown in FIG. 4), the hand of the user draws a circular trajectory 72b of a relatively large radius Ximin on an image obtained by imaging of the imaging unit 15.

In contrast, for example, if the hand of the user is moved to draw a circular trajectory 73a of the radius Xr at the long distance $z_{max}$ (for example, the distance 220 mm shown in FIG. 4), the hand of the user draws a circular trajectory 73b of a relatively small radius Ximax on an image obtained by imaging of the imaging unit 15.

In this case, although the hand of the user is moved to draw a circular trajectory of the same radius Xr, the movements of the pointer 61 differ from each other depending on the distance between the hand of the user and the condensing lens 71.

In addition, if a focal distance of the condensing lens 71 is f, the radius Xr drawn by the hand of the user, and the radii Ximin and Ximax on a captured image are expressed by the following relation (1).

$$Xr=\{(z_{min}-f) \times Ximin\}/f=\{(z_{max}-f) \times Ximax\}/f \quad (1)$$

Therefore, for example, the image processing unit 17 sets a predetermined distance z0 as a reference distance z0 used as a reference. In addition, if the hand of the user is moved to draw a circular trajectory of the same radius Xr, the image processing unit 17 converts (x, y) of a three-dimensional position (x, y, z) calculated at an arbitrary distance z into (x', y') of a three-dimensional position (x', y', z0) on a captured image obtained at the reference distance z0 regardless of the distance z. Further, the image processing unit 17 supplies the three-dimensional position (x, y, z) (=(x', y', z)) after being converted to the holding unit 18 so as to be stored.

Figure 5:
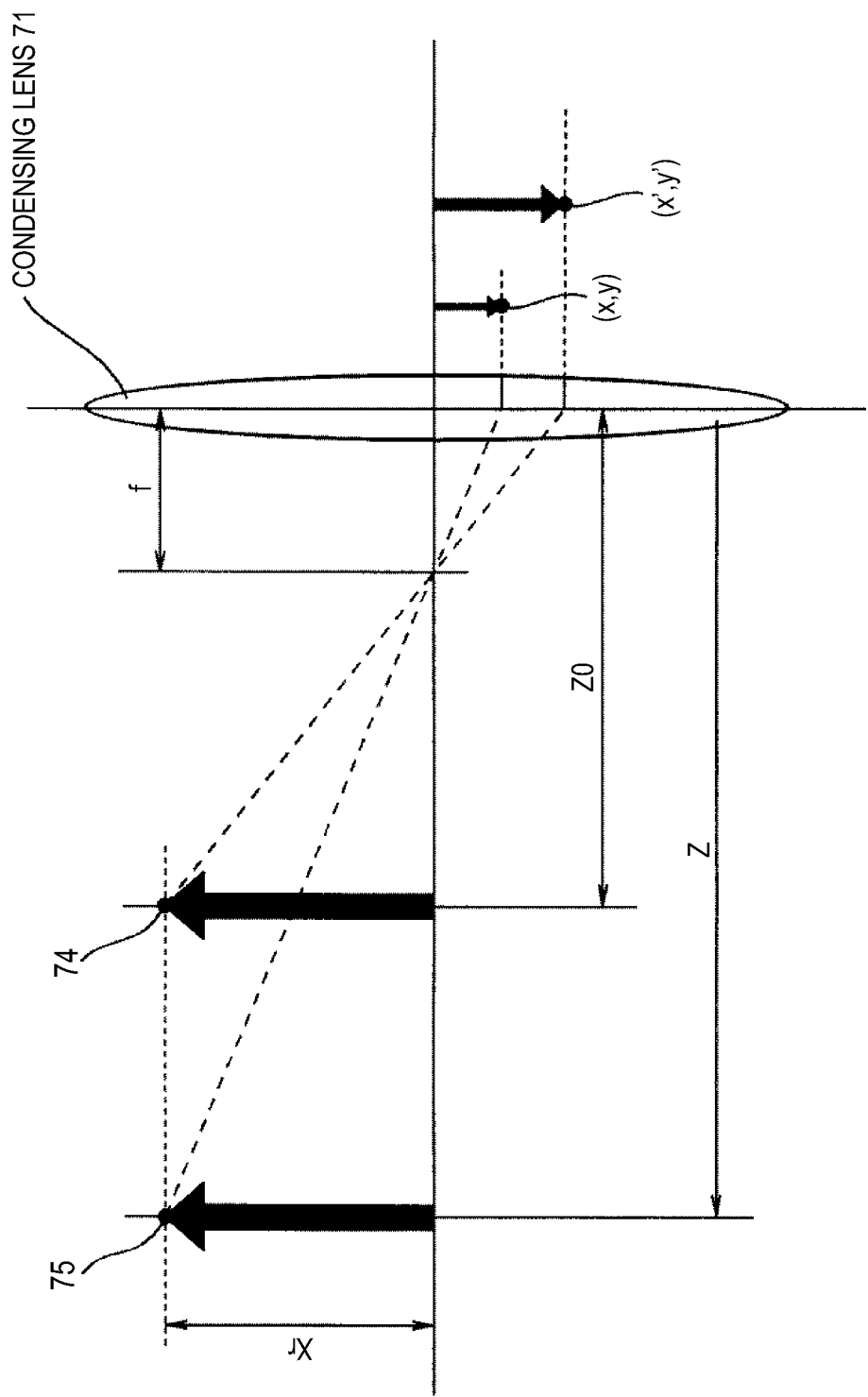
FIG. 5 is a diagram illustrating an example of a form of when an image processing unit converts a three-dimensional position.

Next, FIG. 5 shows an example where the image processing unit 17 converts a calculated three-dimensional position (x, y, z).

In FIG. 5, the three-dimensional positions 74 and 75 indicate positions on the three-dimensional space where the hand of the user in fact is present. In addition, the three-dimensional positions 74 and 75 represent the same XY positions and different distances z (Z positions).

For example, if the hand of the user is present at the three-dimensional position 74 at the reference distance z0, the image processing unit 17 calculates a three-dimensional position (x', y', z0) at the reference distance z0. Further, for example, if the hand of the user is present at the three-dimensional position 75 at an arbitrary distance z, the image processing unit 17 calculates a three-dimensional position (x, y, z) at the arbitrary distance z.

Here, the relation (2) between the X position x calculated at the arbitrary distance z and the X position x' calculated at the reference distance z0, and the relation (3) between the Y position y calculated at the arbitrary distance z and the Y position y' calculated at the reference distance z0 are expressed as in a manner similar to the relation (1), as in the following.

$$Xr=\{(z-f) \times x\}/f=\{(z0-f) \times x'\}/f \quad (2)$$

$$Xr=\{(z-f) \times y\}/f=\{(z0-f) \times y'\}/f \quad (3)$$

When the relation (2) is rearranged in terms of x' and the relation (3) is rearranged in terms of y', respectively, the following relations (4) and (5) are obtained.

$$X'=\{(z-f) \times x\}/(z0-f) \quad (4)$$

$$Y'=\{(z-f) \times y\}/(z0-f) \quad (5)$$

Therefore, the image processing unit 17 converts x of the calculated three-dimensional position (x, y, z) into x' using the relation (4). Further, the image processing unit 17 converts y of the calculated three-dimensional position (x, y, z) into y' using the relation (5). The image processing unit 17 supplies the converted three-dimensional position (x, y, z) (=(x', y', z)) to the holding unit 18 so as to be stored.

In addition, the image processing unit 17 is assumed to hold a preset reference distance z0 in an embedded memory (not shown). The image processing unit 17 converts the calculated three-dimensional position (x, y, z) using the relations (4) and (5), based on the reference distance z0 held in the embedded memory and the calculated three-dimensional position (x, y, z).

Description of Operation of Detection Device

Next, a first interruption process performed by the detection device 1 will be described with reference to the flowchart in FIG. 6.

The first interruption process starts for each predetermined timing in response to the control from the control unit 11. Specifically, for example, the control unit 11 has a timer for measuring time, and executes the first interruption process each time a predetermined time has elapsed using the timer.

In step S1, the control unit 11 to the image processing unit 17 perform a coordinate calculation process of calculating a three-dimensional position $(x, y, z)_t$ of a subject. The coordinate calculation process will be described later in detail with reference to FIG. 7.

In step S2, the image processing unit 17 determines whether or not the three-dimensional position $(x, y, z)_t$ calculated in step S1 this time is abnormal data by a statistical processing method such as a corrected Thompson method based on, for example, the three-dimensional position $(x, y, z)_{t-9}$ to the three-dimensional position $(x, y, z)_t$ held in the holding unit 18.

The corrected Thompson method indicates a method for determining whether or not the calculated three-dimensional position $(x, y, z)_t$ is abnormal data which may not be present statistically, by statistical processing based on a plurality of three-dimensional positions (x, y, z) calculated by the coordinate calculation process.

In the case of using the corrected Thompson method, ten or more three-dimensional positions (x, y, z) are necessary. Therefore, the holding unit 18 holds ten or more latest three-dimensional positions (x, y, z). In addition, the three-dimensional positions (x, y, z) used by the corrected Thompson method are preferably thirty or more from the viewpoint of securing reliability by the statistical processing.

In step S2, if the image processing unit 17 determines that the calculated three-dimensional position $(x, y, z)_t$ is abnormal data by the corrected Thompson method, the flow goes to step S3. In addition, the image processing unit 17 discards the calculated three-dimensional position $(x, y, z)_t$ (does not store it in the holding unit 18).

In addition, if the image processing unit 17 determines that the calculated three-dimensional position $(x, y, z)_t$ is not abnormal data by the corrected Thompson method in step S2, the flow goes to step S4.

In step S4, the image processing unit 17 deletes the oldest three-dimensional position (x, y, z) among the three-dimensional positions (x, y, z) stored in the holding unit 18. The image processing unit 17 supplies the calculated three-dimensional position $(x, y, z)_t$ to the holding unit 18 so as to be stored. Thereby, the holding unit 18 holds the latest three-dimensional positions (x, y, z) at all times.

In step S5, the mode processing unit 19 calculates a movement distance Dxy of the coordinate point (x, y) and a movement distance Dz of the coordinate point z within a predetermined time based on the plurality of three-dimensional positions (x, y, z) stored in the holding unit 18.

In addition, the coordinate point (x, y) indicates a coordinate point defined by values x and y on the X axis and the Y axis of the three-dimensional position (x, y, z). The coordinate point z indicates a coordinate point defined by a value z on the Z axis of the three-dimensional position (x, y, z).

That is to say, for example, in step S5, the mode processing unit 19 reads, for example, a three-dimensional position (x, y, z)$_t$ and a three-dimensional position (x, y, z)$_{t-1}$ among the plurality of three-dimensional positions (x, y, z) stored in the holding unit 18.

In addition, the mode processing unit 19 calculates the movement distance Dxy of the coordinate point (x, y) and the movement distance Dz of the coordinate point z based on the read three-dimensional position (x, y, z)$_t$ and three-dimensional position (x, y, z)$_{t-1}$.

In addition, if x, y, and z at the three-dimensional position (x, y, z)$_t$ are respectively indicated by $x_t$, $y_t$, and $z_t$, the movement distance Dxy of the coordinate point (x, y) is expressed by the equation $\{(x_t-x_{t-1})^2+(y_t-y_{t-1})^2\}^{1/2}$, and the movement distance Dz of the coordinate point z is expressed by the equation $|z_t-z_{t-1}|$.

In step S6, the mode processing unit 19 determines whether or not the calculated movement distance Dxy is larger than the calculated movement distance Dz. In addition, if the mode processing unit 19 determines that the calculated movement distance Dxy is not larger than the calculated movement distance Dz, the flow goes to step S7.

In step S7, the mode processing unit 19 selects the coordinate point z from the coordinate point (x, y) and the coordinate point z, and performs the click mode process based on the selected coordinate point z (each of coordinate points z of the plurality of three-dimensional positions (x, y, z) held in the holding unit 18). The click mode process will be described later in detail with reference to FIG. 8.

In step S6, if the mode processing unit 19 determines that the calculated movement distance Dxy is larger than the calculated movement distance Dz, the flow goes to step S8.

The mode processing unit 19 selects the coordinate point (x, y) from the coordinate point (x, y) and the coordinate point z, and calculates a movement velocity Vxy of the coordinate point (x, y) at a predetermined time based on the selected coordinate point (x, y) (each of the coordinate points (x, y) of the plurality of three-dimensional positions (x, y, z) held in the holding unit 18).

In step S9, the mode processing unit 19 determines whether or not a magnitude of the calculated movement velocity Vxy is equal to or more than a preset threshold value A, and if it is determined that the magnitude is equal to or more than the threshold value A, the flow goes to step S10 where the rotation mode process is executed. The rotation mode process will be described later in detail with reference to FIG. 9.

If the mode processing unit 19 determines that the magnitude of the calculated movement velocity Vxy is not equal to or more than the threshold value A in step S9, the flow goes to step S11, where, for example, the pointer mode process of moving the pointer 61 to a position corresponding to the coordinate point (x, y) of the three-dimensional position (x, y, z)$_t$ calculated and held in the holding unit 18, is executed. As such, the first interruption process finishes.

The reason why if the magnitude of the movement velocity Vxy is equal to or more than the threshold value A, the rotation mode process is executed in the mode processing unit 19, and if the movement velocity Vxy is smaller than the threshold value A, the pointer mode process is executed therein, is as follows.

That is to say, there are many cases where the user moves the hand faster in a case of performing the rotation mode process by moving the pointer 61 so as to draw a circle in the clockwise rotation or counterclockwise rotation than in a case of performing the pointer mode process of moving the pointer 61 by moving his/her hand. In addition, it is assumed that the threshold value A is obtained by a test or the like performed in advance by the present inventors or the like and is stored in advance in the memory or the like (not shown) embedded in the mode processing unit 19.

As described above, according to the first interruption process, in step S6, it is determined whether or not a process to be executed is set to the click mode process based on the movement distance Dxy and the movement distance Dz calculated as user movement information indicating the movement of the hand or the like of the user.

When the flow goes from step S6 to step S9 via step S8, in step S9, it is determined whether or not a process to be executed is set to the pointer mode process based on the movement velocity Vxy as the user movement information.

That is to say, when the flow goes from step S6 to step S9 via step S8, it is determined whether or not a process to be executed is set to the pointer mode process using the movement velocity Vxy in addition to the movement distance Dxy and the movement distance Dz as the user movement information.

Further, when the flow goes from step S9 to step S10, in the rotation mode process in step S10, as described later with reference to FIG. 9, a process to be executed as the rotation mode process (for example, in FIG. 9 described later, any process of processes in step S74 to step S76, a process in step S78, or a process in step S79) is set based on the curvature which is the user movement information and the curvature for a trajectory of the pointer 61.

That is to say, when the flow goes from step S6 to step S10 via steps S8 and S9, a process to be executed is set using the curvature in addition to the movement distance Dxy, the movement distance Dz, and the movement velocity Vxy as the user movement information.

For this reason, according to the first interruption process, it is possible to correctly identify and perform a process which the user intends to perform, and further to prevent a process which the user does not intend to perform from being performed.

In addition, in steps S9 to S11, although the mode processing unit 19 sets a process to be executed based on whether or not the magnitude of the calculated movement velocity Vxy is equal to or more than the preset threshold value A, a process to be executed may be set based on a movement direction of the movement velocity Vxy instead of the magnitude of the movement velocity Vxy.

In addition, for example, a process to be executed may be set using the movement velocity Vxy and the movement direction.

Further, in step S8, the mode processing unit 19 calculates the movement velocity Vxy of the coordinate point (x, y) as the vector quantity indicating the movement direction and the velocity (magnitude) of the coordinate point (x, y), based on the selected coordinate point (x, y).

However, in step S8, the mode processing unit 19 may calculate the velocity of the coordinate point (x, y) as the scalar quantity. In this case, in step S9, the mode processing unit 19 determines whether or not the velocity of the calculated coordinate point (x, y) is equal to or more than the preset threshold value A. In addition, if a process to be executed is set based on the movement direction of the coordinate point (x, y) in step S9, the movement direction of the coordinate point (x, y) may be calculated in step S8.

In addition, in the first interruption process, in a case where a process to be executed using the coordinate point z is present in plurality in addition to the click mode process, for example, when the flow goes from step S6 to S7, a movement velocity Vz of the coordinate point z at a predetermined time is calculated, and a process to be executed using the coordinate point z is set based on the movement velocity Vz.

In addition, for example, although as coordinate points used in the mode processing unit 19, for example, the coordinate point (x, y) and the coordinate point z are employed, the coordinate points are not limited thereto, but may employ, for example, the coordinate point x defined by a value x on the X axis of the three-dimensional position (x, y, z), the coordinate point (x, z) defined by values x and z on the X and Z axes of the three-dimensional position (x, y, z), or the like.

Further, for example, although two coordinate points (the coordinate point (x, y) and the coordinate point z) are employed as coordinate points used in the mode processing unit 19, the number of the coordinate points may be three or more.

In this case, in step S5, the mode processing unit 19 calculates a movement distance for each of three or more coordinate points. In the subsequent processes, a process to be executed is set using the movement distance of each of three or more coordinate points.

Details of Coordinate Calculation Process

Next, the coordinate calculation process in step S1 in FIG. 6 will be described in detail with reference to the flowchart in FIG. 7.

In step S31, the LED 13-1 irradiates a subject with the light of the wavelength $\lambda 1$. The irradiation light is reflected by the subject along with ambient light, and is incident to the imaging unit 15 via the optical filter 14. In step S32, the imaging unit 15 performs a photoelectric conversion for the incident light so as to generate a first image which is supplied to the imaging control unit 16.

In step S33, the LED 13-2 irradiates the subject with the light of the wavelength $\lambda 2$. The irradiation light is reflected by the subject along with ambient light, and is incident to the imaging unit 15 via the optical filter 14. In step S34, the imaging unit 15 performs the photoelectric conversion for the incident light so as to generate a second image which is supplied to the imaging control unit 16.

The imaging control unit 16 supplies the first image and the second image supplied from the imaging unit 15 to the image processing unit 17.

In step S35, the image processing unit 17 calculates a difference $S=Y1-Y2$ between the luminance values Y1 and Y2 corresponding to the first and second images, binarizes the difference S through comparison with a predetermined threshold value, and detects one (a region corresponding to the difference S, equal to or more than a predetermined threshold value) of the binarized regions as a skin region.

In step S36, the image processing unit 17 calculates a three-dimensional position $(x, y, z)_t$ of the subject based on the detected skin region. That is to say, for example, the image processing unit 17 calculates a center of the skin region as (x, y) of the three-dimensional position $(x, y, z)_t$. In addition, for example, the image processing unit 17 calculates the distance z to the subject, of the three-dimensional position $(x, y, z)_t$, based on the size of the detected skin region. In addition, in such a manner as described with reference to FIG. 5, the image processing unit 17 converts (x, y) of the calculated three-dimensional position $(x, y, z)_t$ of the subject into (x', y'), and supplies the three-dimensional position $(x, y, z)_t (=(x', y', z)_t)$ after being converted to the holding unit 18 so as to be stored (held).

In addition, the image processing unit 17 calculates the distance z to the subject using the fact that the shorter the distance z to the subject, the larger the size of the skin region.

In addition, the image processing unit 17 may calculate the distance z to the subject using the fact that the shorter the distance from the LED 13-1 and the LED 13-2 to the subject, the larger the luminance value (for example, an average luminance value, or the like) of the skin region.

Figure 6:
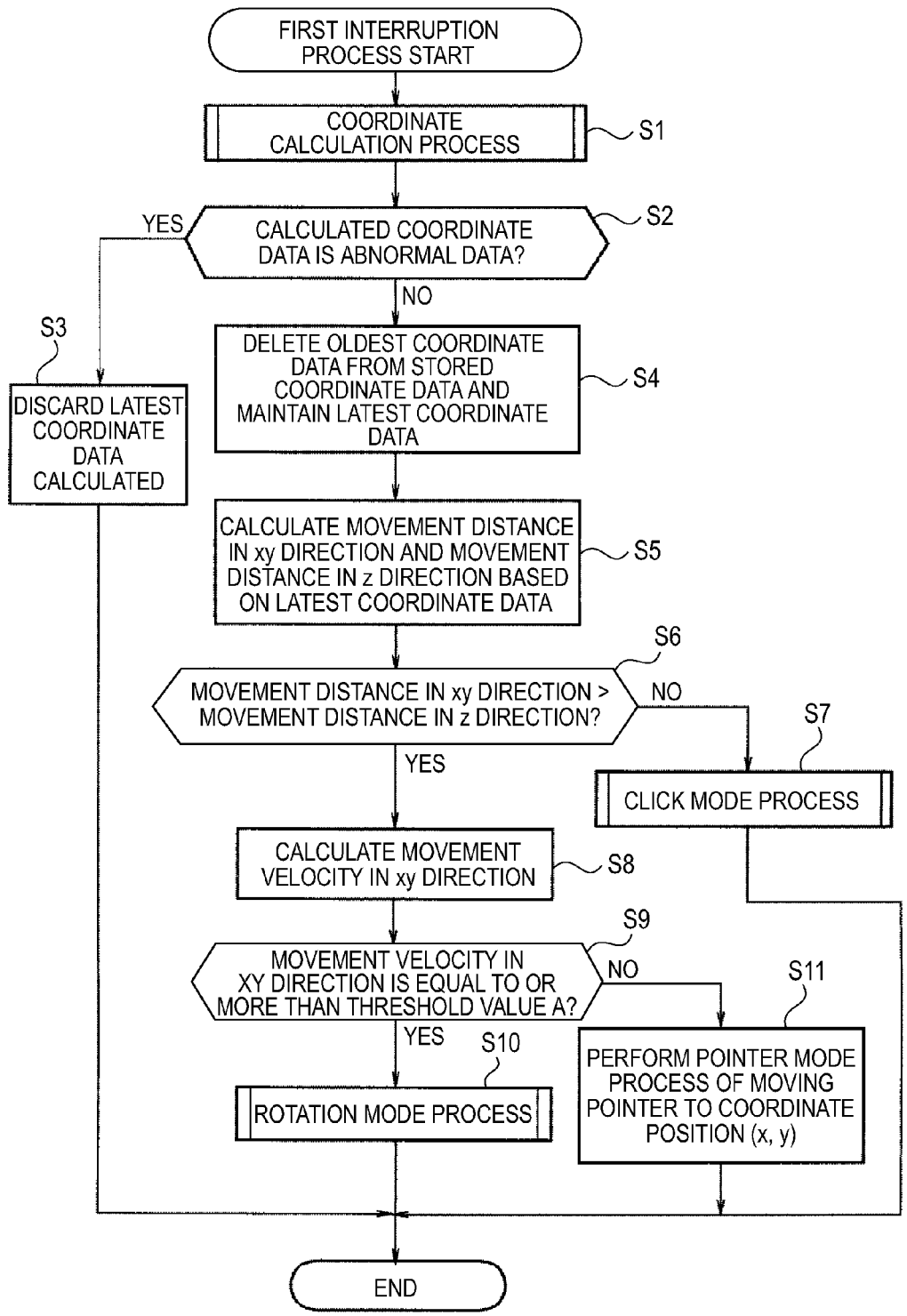
FIG. 6 is a flowchart illustrating a first interruption process performed by the detection device.
Figure 7:
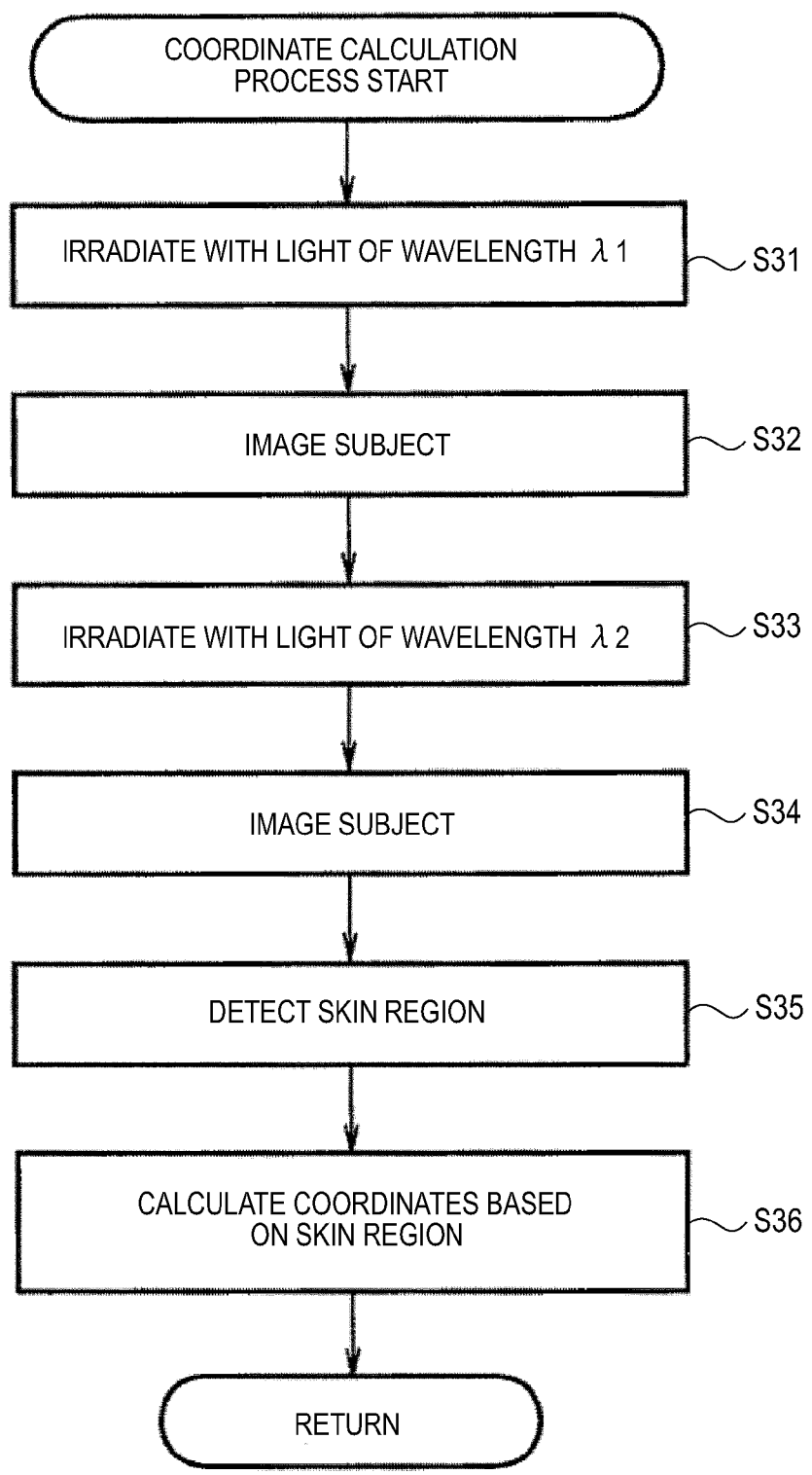
FIG. 7 is a flowchart illustrating details of a coordinate calculation process.

As such, the coordinate calculation process finishes, and the flow returns to step S1 in FIG. 6.

Details of Click Mode Process

Next, the click mode process in step S7 in FIG. 6 will be described in detail with reference to the flowchart in FIG. 8.

In step S51, the mode processing unit 19 calculates a movement distance Dz where the selected coordinate point z is moved within a predetermined time, based on the selected coordinate point z (for example, the coordinate point z of each of a plurality of three-dimensional positions (x, y, z) held in the holding unit 18).

In addition, the mode processing unit 19 determines whether or not a user performs a click operation (hereinafter, also referred to as a click action) based on whether or not the calculated movement distance Dz is equal to or more than a predetermined distance threshold value.

In addition, in step S51, the mode processing unit 19 may use the movement distance Dz calculated by the process in step S5 instead of the newly calculated movement distance Dz based on the selected coordinate point z. In this case, since the process of calculating the new movement distance Dz can be omitted, it is possible to perform the processes more rapidly.

If it is determined that the calculated movement distance Dz is equal to or more than the predetermined distance threshold value, the mode processing unit 19 determines that the click action is performed, and the flow goes to step S52.

In step S52, the mode processing unit 19 determines whether or not a focused (selected) icon is present based on the focus information held in the holding unit 18, and if it is determined that a focused icon is present, the flow goes to step S53.

In addition, the mode processing unit 19 treats the click action as being performed at the barycentric position (x, y) of the focused icon. That is to say, for example, as the focused icon being clicked, the mode processing unit 19 executes a process performed corresponding to the click of the icon.

Further, in step S52, if the mode processing unit 19 determines that a focused icon is not present based on the focus information held in the holding unit 18, the flow goes to step S54.

In step S54, the mode processing unit 19 detects a barycentric position closest to a point (indicating a position of the pointer 61) on the display screen corresponding to the coordinate point (x, y) of the three-dimensional position $(x, y, z)_t$, among barycentric positions of a plurality of icons (for example, the icons 41 to 46 in FIG. 2). The mode processing unit 19 focuses (selects) an icon corresponding to the detected barycentric position.

In step S55, the mode processing unit 19 calculates a distance between the barycentric position of the focused icon and the position on the display screen of the display unit 20, corresponding to the coordinate point (x, y) of the three-dimensional position $(x, y, z)_t$, and determines whether or not the calculated distance is greater than the length of a longer side of width and height of the selected icon.

If it is determined that the calculated distance is greater than the length of the longer side of the focused icon, the mode processing unit 19 cancels the focus on the icon in step S55, and finishes the click mode process.

In addition, if the mode processing unit 19 determines that the calculated distance is not greater than the length of the longer side of the focused icon in step S55, the flow goes to step S56.

In step S56, the mode processing unit 19 treats the click action as being performed at the barycentric position (x, y) of the focused icon. That is to say, for example, as the focused icon being clicked, the mode processing unit 19 executes a process performed corresponding to the click of the icon. Further, the mode processing unit 19 updates the focus information held in the holding unit 18 to information indicating that the icon clicked by the process in step S56 is focused.

As such, after the click mode process ends, the flow returns to step S7 in FIG. 6, and the first interruption process finishes.

As described above, according to the click mode process, if the mode processing unit 19 determines that the calculated distance is not greater than the length of the longer side of the focused icon in step S55, the flow goes to step S56, where the icon focused by the process in step S54 is treated as being clicked.

Therefore, it is possible to click a desired icon even if the icon regarded as a click target is relatively small. For this reason, since the size of an icon displayed on the display screen of the display unit 20 can be reduced, it is possible to display many icons on the display screen of the display unit 20.

Details of Rotation Mode Process

Next, the rotation mode process in step S10 in FIG. 6 will be described in detail with reference to the flowchart in FIG. 9.

In step S71, the mode processing unit 19 calculates a function indicating a trajectory of the pointer 61 on the display screen of the display unit 20, using the least squares method or the like, based on the respective coordinate points (x, y) of a plurality of three-dimensional positions (x, y, z) held in the holding unit 18. The mode processing unit 19 calculates the curvature indicating to what degree a curve (a trajectory of the pointer 61) indicated by the function is bent, based on the calculated function.

In step S72, the mode processing unit 19 calculates whether the trajectory of the pointer 61 is moved in the clockwise rotation or in the counterclockwise rotation, based on the function calculated by the process in step S71.

In step S73, the mode processing unit 19 determines whether or not the curvature calculated by the process in step S71 is a value larger than a threshold value B and smaller than a threshold value C, that is, the curvature is a curvature assumed when the pointer 61 is moved such that a user draws a circle in the clockwise rotation or the counterclockwise rotation.

In addition, the threshold values B and C are set in advance, and, for example, the threshold value B is regarded as a reciprocal of a shorter side of the lengths of height and width of the display screen (the image on which the pointer 61 is displayed) of the display unit 20. For example, the threshold value C is regarded as one obtained by adding a predetermined value to the threshold value B. The threshold values B and C, for example, are held in advance in the memory (not shown) embedded in the mode processing unit 19.

In step S73, if the mode processing unit 19 determines that the curvature calculated by the process in step S71 is a value larger than the threshold value B and smaller than the threshold value C, that is, the curvature is a curvature assumed when the pointer 61 is moved such that a user draws a circle in the clockwise rotation or the counterclockwise rotation, the flow goes to step S74.

In step S74, the mode processing unit 19 determines whether or not the trajectory of the pointer 61 calculated by the process in step S72 is the clockwise rotation, and if it is determined that the trajectory is the clockwise rotation, the flow goes to step S75. In addition, the mode processing unit 19 sequentially selects a plurality of icons displayed on the display unit 20 in the clockwise rotation.

Further, in step S74, if the mode processing unit 19 determines that the trajectory of the pointer 61 calculated by the process in step S72 is not the clockwise rotation, that is, the counterclockwise rotation, the flow goes to step S76. The mode processing unit 19 sequentially selects a plurality of icons displayed on the display unit 20 in the counterclockwise rotation.

On the other hand, in step S73, if the mode processing unit 19 determines that the curvature calculated by the process in step S71 is not a value larger than the threshold value B and smaller than the threshold value C, that is, the curvature is not a curvature assumed when the pointer 61 is moved such that a user draws a circle in the clockwise rotation or the counterclockwise rotation, the flow goes to step S77.

Figure 8:
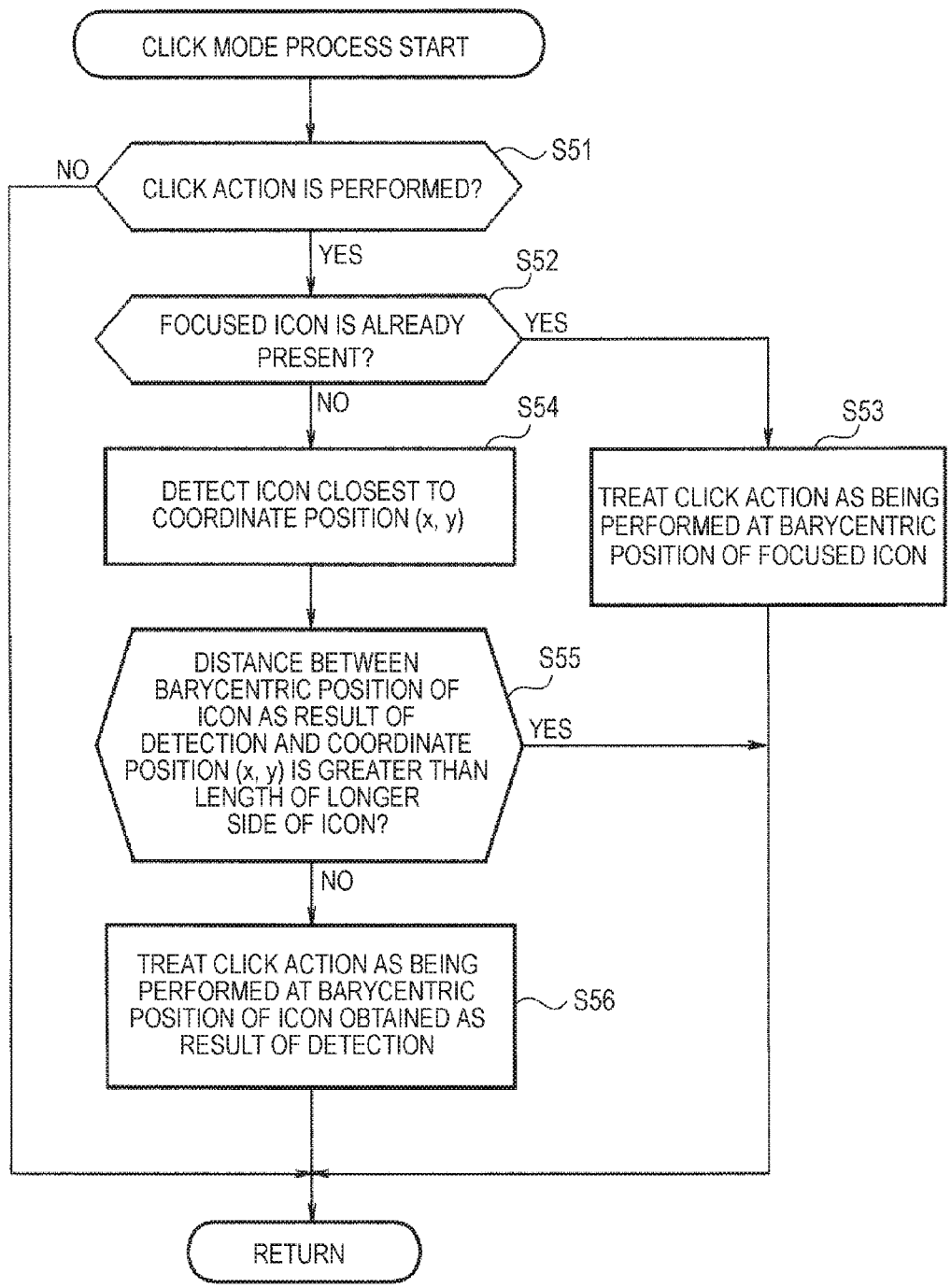
FIG. 8 is a flowchart illustrating details of a click mode process.

In step S77, the mode processing unit 19 determines whether or not the curvature calculated by the process in step S71 is equal to or less than the threshold value B, and if it is determined that the curvature is equal to or less than the threshold value B, the flow goes to step S78, where the click mode process in FIG. 8 is executed and the rotation mode process finishes.

In step S77, in a case where the mode processing unit 19 determines that the curvature calculated by the process in step S71 is not equal to or less than the threshold value B, that is, the curvature is equal to or more than the threshold value C, the mode processing unit 19 regards the case as a case where an icon is intended to be selected through the movement of the pointer 61 by the pointer mode process, and the flow goes to step S79, where the icon is selected based on the coordinate point (x, y) of the three-dimensional position $(x, y, z)_t$.

As such, the rotation mode process ends, the flow returns to step S10 in FIG. 6, and the first interruption process finishes.

In the first interruption process, although the movement distance Dxy, the movement distance Dz, the movement velocity Vxy, and the curvature are used as the user movement information, for example, only the movement velocity Vxy and the curvature may be used as the user movement information.

Description of Other Operations of Detection Device

Next, a second interruption process using only the movement velocity Vxy and the curvature as the user movement information will be described with reference to the flowchart in FIG. 10.

The second interruption process starts for each predetermined timing in response to the control from the control unit 11 in a manner similar to the case where the first interruption process starts.

In steps S91 to S94, processes similar to those in steps S1 to S4 in FIG. 6 are performed. In step S96, the movement velocity Vxy of the coordinate point (x, y) at a predetermined time is calculated in a manner similar to step S8 in FIG. 6.

That is to say, for example, in step S96, the mode processing unit 19 selects the coordinate point (x, y) from the coordinate point (x, y) and the coordinate point z, and calculates the movement velocity Vxy of the coordinate point (x, y) at a predetermined time based on the selected coordinate point (x, y) (each of the coordinate points (x, y) of the plurality of three-dimensional positions (x, y, z) held in the holding unit 18).

Figure 9:
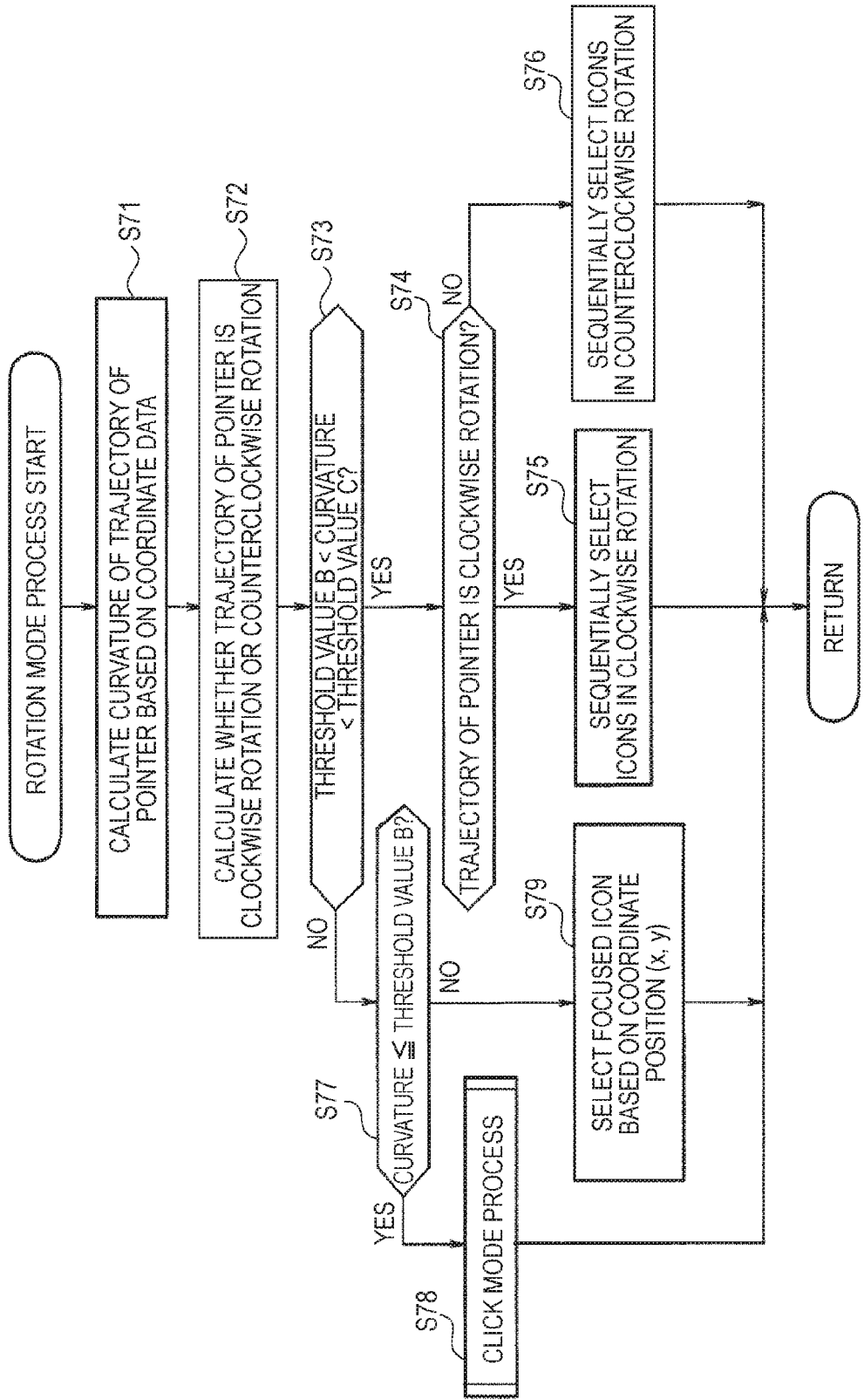
FIG. 9 is a flowchart illustrating details of a rotation mode process.

In step S96, the mode processing unit 19 determines whether or not a magnitude of the calculated movement velocity Vxy is equal to or more than a preset threshold value A1 in a manner similar to S9 in FIG. 6, and if it is determined that the magnitude is equal to or more than the threshold value A1, the flow goes to step S97 where the rotation mode process in FIG. 9 is executed.

If the mode processing unit 19 determines that the magnitude of the calculated movement velocity Vxy is not equal to or more than the threshold value A1 in step S96, the flow goes to step S98. In addition, the mode processing unit 19 determines whether the magnitude of calculated the movement velocity Vxy is equal to or more than a threshold value A2 which is smaller than the threshold value A1, and if it is determined that the magnitude is equal to or more than the threshold value A2, that is, the magnitude of the calculated movement velocity Vxy is equal to or more than the threshold value A2 and smaller than the threshold value A1, the flow goes to step S99. In step S99, the mode processing unit 19 performs the pointer mode process similar to the process in step S11 in FIG. 6.

In addition, in step S98, if the mode processing unit 19 determines that the magnitude of the calculated movement velocity Vxy is not equal to or more than the threshold value A2 (smaller than the threshold value A2), the flow goes to step S100, where the click mode process in FIG. 8 is executed. As such, the second interruption process is finished.

As described above, according to the second interruption process, in the processes in steps S96 and S98, a process to be executed is set to one of the rotation mode process, the pointer mode process, and the click mode process based on the movement velocity Vxy calculated as the user movement information.

In addition, when the flow goes from the step S96 to step S97, in the rotation mode process in step S97, a process to be executed is set to the rotation mode process based on the curvature as the user movement information.

That is to say, when the flow goes from the S96 to step S97, a process to be executed is set using the curvature in addition to the movement velocity Vxy as the user movement information.

For this reason, according to the second interruption process, it is possible to correctly identify and execute a process which the user intends to perform, and further to prevent a process which the user does not intend to perform from being performed.

In addition, in the second interruption process, setting a process to be executed using the magnitude of the movement velocity Vxy is based on the findings that the movement velocity of the hand of a user is different in the rotation mode process, the pointer mode process, and the click mode process, through tests or the like performed in advance. The above-described threshold values A1 and A2 are obtained in advance from results of the tests or the like performed in advance, and are held in the memory (not shown) or the like embedded in the mode processing unit 19.

According to the first and second interruption processes, although one of the rotation mode process, the pointer mode process, the click mode process is executed, in addition to the processes, a line mode process of performing a predetermined process so as to correspond to a movement of the pointer 61 in a straight line direction may be included.

Specifically, for example, instead of the rotation mode process (the process in step S10 in FIG. 6, or the process in step S97 in FIG. 10) in the first and second interruption processes, one of the rotation mode process, the pointer mode process, the click mode process, and the line mode process can be performed by performing a mode selection process described later with reference to FIG. 11.

Details of Mode Selection Process

Next, the mode selection process performed by the detection device 1 will be described with reference to the flowchart in FIG. 11.

In step S121, the mode processing unit 19 calculates a function indicating a trajectory of the pointer 61 on the display screen of the display unit 20, using the least squares method or the like, based on the respective coordinate points (x, y) of a plurality of three-dimensional positions (x, y, z) held in the holding unit 18. The mode processing unit 19 calculates the curvature indicating to what degree a curve (a trajectory of the pointer 61) indicated by the function is bent, based on the calculated function.

In step S122, the mode processing unit 19 determines whether or not the curvature calculated by the process in step S121 is equal to or more than a threshold value C, and if it is determined that the curvature is equal to or more than the threshold value C, the flow goes to step S123 where the pointer mode process is executed.

In addition, in step S122, if the mode processing unit 19 determines that the curvature calculated by the process in step S121 is not equal to or more than the threshold value C (smaller than the threshold value C), the flow goes to step S124.

In step S124, the mode processing unit 19 determines whether or not the curvature calculated by the process in step S121 is equal to or less than a threshold value B smaller than the threshold value C. If the mode processing unit 19 determines that the curvature is not equal to or less than the threshold value B (larger than the threshold value B), that is, the curvature is larger than the threshold value B and smaller than the threshold value C, the flow goes to step S125 where the rotation mode process is executed.

That is to say, in step S125, the mode processing unit 19 performs the processes in step S72 and steps S74 to S76 in FIG. 9 as the rotation mode process.

Specifically, the mode processing unit 19 calculates whether the trajectory of the pointer 61 is moved in the clockwise rotation or in the counterclockwise rotation, based on the function calculated by the process in step S121. The mode processing unit 19 determines whether or not the calculated trajectory of the pointer 61 is the clockwise rotation, and if the trajectory is the clockwise rotation, sequentially selects a plurality of icons displayed on the display unit 20 in the clockwise rotation. In addition, if the mode processing unit 19 determines that the calculated trajectory of the pointer 61 is not the clockwise rotation, that is, the counterclockwise rotation, sequentially selects a plurality of icons displayed on the display unit 20 in the counterclockwise rotation.

On the other hand, in step S124, if the mode processing unit 19 determines that the curvature calculated in step S121 is equal to or less than the threshold value B, the flow goes to step S126 where the line mode process is executed. As such, the mode selection process finishes. The mode selection process will be described with reference to the flowchart in FIG. 12.

As described above, according to the mode selection process, a process to be executed is set to one of the pointer mode process, the rotation mode process, and the line mode process according to the curvature of the trajectory drawn by the pointer 61, and the set process is executed.

In addition, in the mode selection process, setting a process to be executed according to the curvature of the trajectory drawn by the pointer 61 is based on the findings that the curvature drawn by the pointer 61 is different in the pointer mode process, the rotation mode process, and the line mode process, through tests or the like performed in advance.

Figure 10:
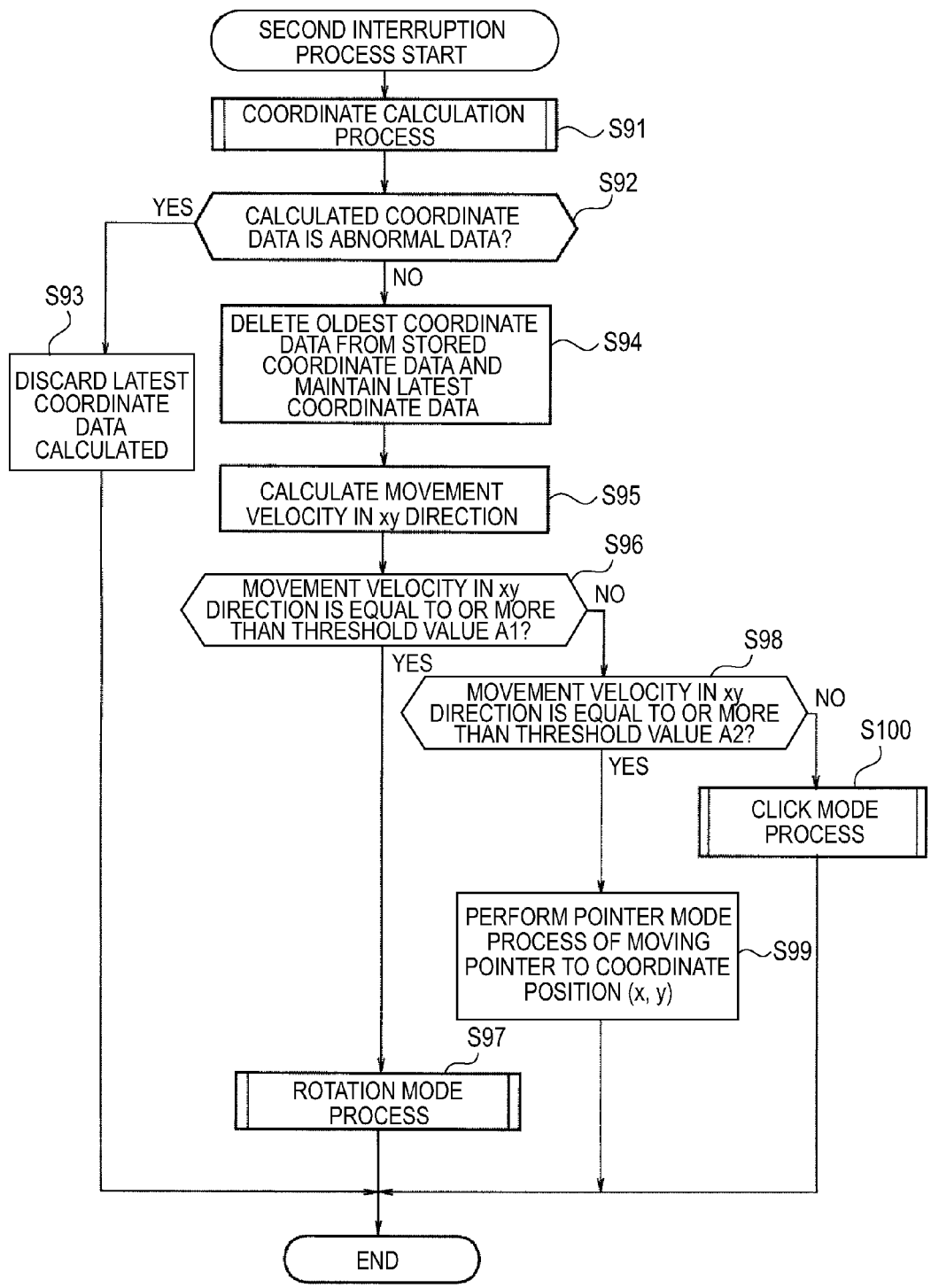
FIG. 10 is a flowchart illustrating a second interruption process performed by the detection device.

Further, the mode selection process may be performed instead of the process in step S10 in FIG. 6, or the process in step S97 in FIG. 10, and the mode selection process may be performed instead of the processes in steps S5 to S11 in the first interruption process. In this case, a process to be executed is set using only the curvature as the user movement information.

In this case, since a process to be executed is set using only the curvature of a trajectory drawn by the pointer 61 in the first interruption process, it is not necessary to calculate the movement velocity Vxy, the movement distance Dxy, and the movement distance Dz as in the first interruption process (the first interruption process in a case of not performing the mode selection process) described with reference to FIG. 6, and thus it is possible to set and perform a process more rapidly.

Details of Line Mode Process

Next, the line mode process in step S126 in FIG. 11 will be described with reference to the flowchart in FIG. 12.

In step S141, the mode processing unit 19 calculates a function indicating a trajectory of the pointer 61 on the display screen of the display unit 20, using the least squares method or the like, based on the respective coordinate points (x, y) of a plurality of three-dimensional positions (x, y, z) held in the holding unit 18. The mode processing unit 19 calculates a slope (an absolute value thereof) of a straight line indicating the trajectory of the pointer 61, based on the calculated function (in this case, indicating the straight line which is the trajectory of the pointer 61).

Figure 11:
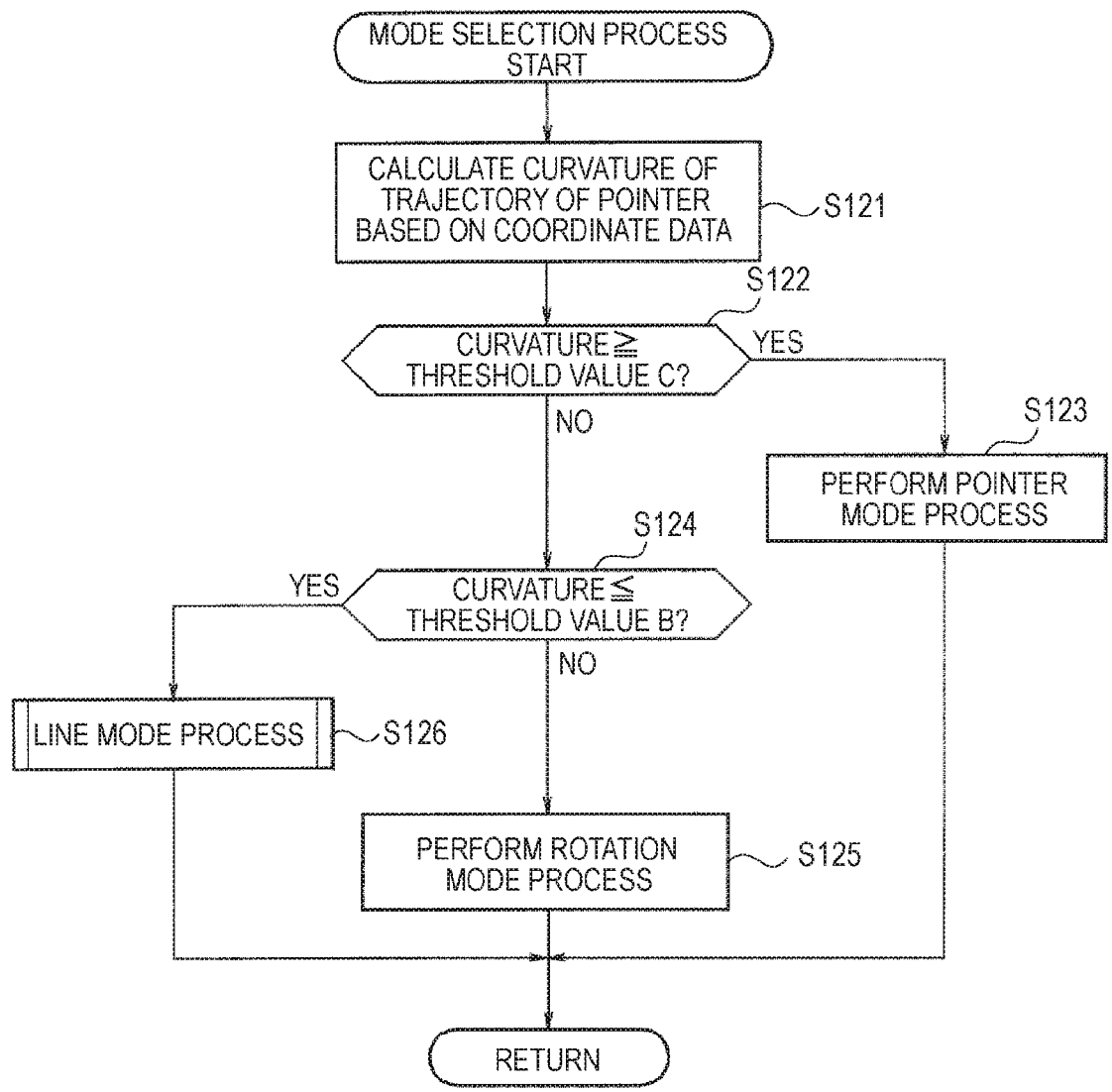
FIG. 11 is a flowchart illustrating details of a mode selection process.
Figure 12:
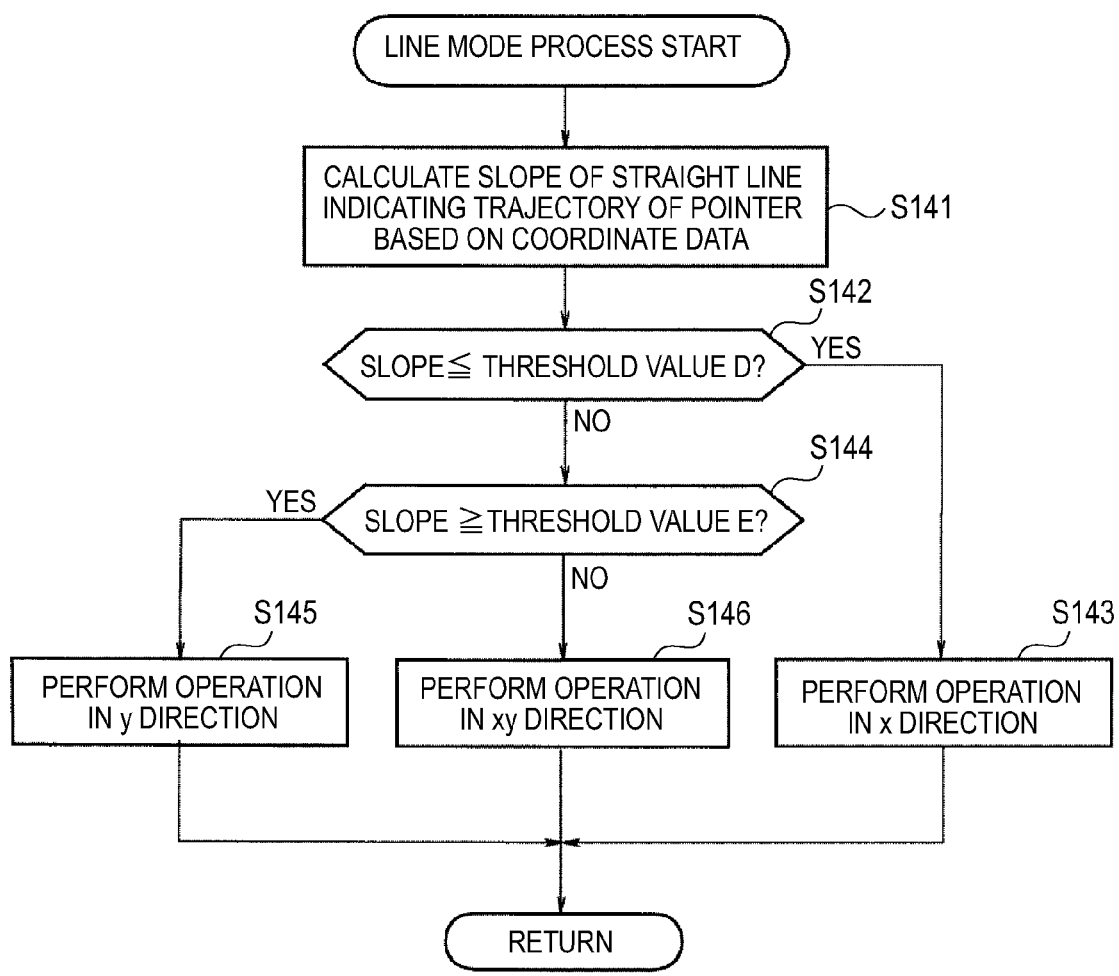
FIG. 12 is a flowchart illustrating details of a line mode process.

In addition, in step S141, the mode processing unit 19 may calculate a slope of a straight line indicating the trajectory of the pointer 61 based on the function calculated in step S121 in FIG. 11. In this case, the process of calculating the function in step S141 can be omitted.

In step S142, the mode processing unit 19 determines whether or not the slope calculated by the process in step S141 is equal to or less than a preset threshold value D, and if it is determined that the slope is equal to or less than the threshold value D (>0), that is, it is determined that the pointer 61 is moved substantially in the X direction (the horizontal direction), the flow goes to step S143.

In step S143, the mode processing unit 19 executes a process in a case where the pointer 61 is moved in the X direction. Specifically, for example, in a case where the detection device 1 is embedded in an audio player which reproduces music or the like, in step S143, the mode processing unit 19 of the detection device 1 controls the audio player to perform a process (for example, fast-forward of music or the like) corresponding to the X direction.

In step S142, if the mode processing unit 19 determines that the slope calculated by the process in step S141 is not equal to or less than the preset threshold value D (larger than the threshold value D), the flow goes to step S144.

In step S144, the mode processing unit 19 determines whether or not the slope calculated by the process in step S141 is equal to or more than a preset threshold value E larger than the threshold value D, and if it is determined that the slope is equal to or more than the threshold value E, that is, it is determined that the pointer 61 is moved substantially in the Y direction (the vertical direction), the flow goes to step S145.

In step S145, the mode processing unit 19 performs a process in a case where the pointer 61 is moved in the Y direction. Specifically, for example, in a case where the detection device 1 is embedded in an audio player which reproduces music or the like, in step S145, the mode processing unit 19 of the detection device 1 controls the audio player to perform a process (for example, rewind of music or the like) corresponding to the Y direction.

In step S144, if the mode processing unit 19 determines that the slope calculated by the process in step S141 is not equal to or more than the preset threshold value E (that is, larger than the threshold value D and smaller than the threshold value E), the pointer 61 is moved neither in the X direction nor in the Y direction, that is, in the XY direction (tilted direction), the flow goes to step S146.

In step S146, the mode processing unit 19 executes a process in a case where the pointer 61 is moved in the XY direction. Specifically, for example, in a case where the detection device 1 is embedded in an audio player which reproduces music or the like, in step S146, the mode processing unit 19 of the detection device 1 controls the audio player to perform a process (for example, reproduction of music or the like) corresponding to the XY direction.

As such, the line mode process finishes, and the flow returns to step S126 in FIG. 11.

In the line mode process, although the three directions, the X direction, the Y direction, and the XY direction are used as the movement directions, and different processes correlated with the respective three directions are performed, the movement directions are not limited to the three directions. In addition, values or the number of the threshold values compared with the slope are changed depending on the number of the movement directions.

In addition, in the line mode process, the mode processing unit 19 may also calculate that the pointer 61 is moved in any direction from any direction, based on the respective coordinate points (x, y) of a plurality of three-dimensional positions (x, y, z) held in the holding unit 18, and may perform a corresponding process based on the calculated result as well.

In this case, for example, if the pointer 61 is moved in the X direction, different processes may be performed in a case of being moved from the left to the right and in a case of being moved from the right to the left.

Addition of Tutorial Mode

In the detection device 1, although the pointer 61 is moved by moving the hand of a user in the X direction or in the Y direction, or the click action is detected by moving the hand in the Z direction, if the user is not used to moving the pointer 61 through the movement of the hand, a tutorial mode may be provided.

Figure 13:
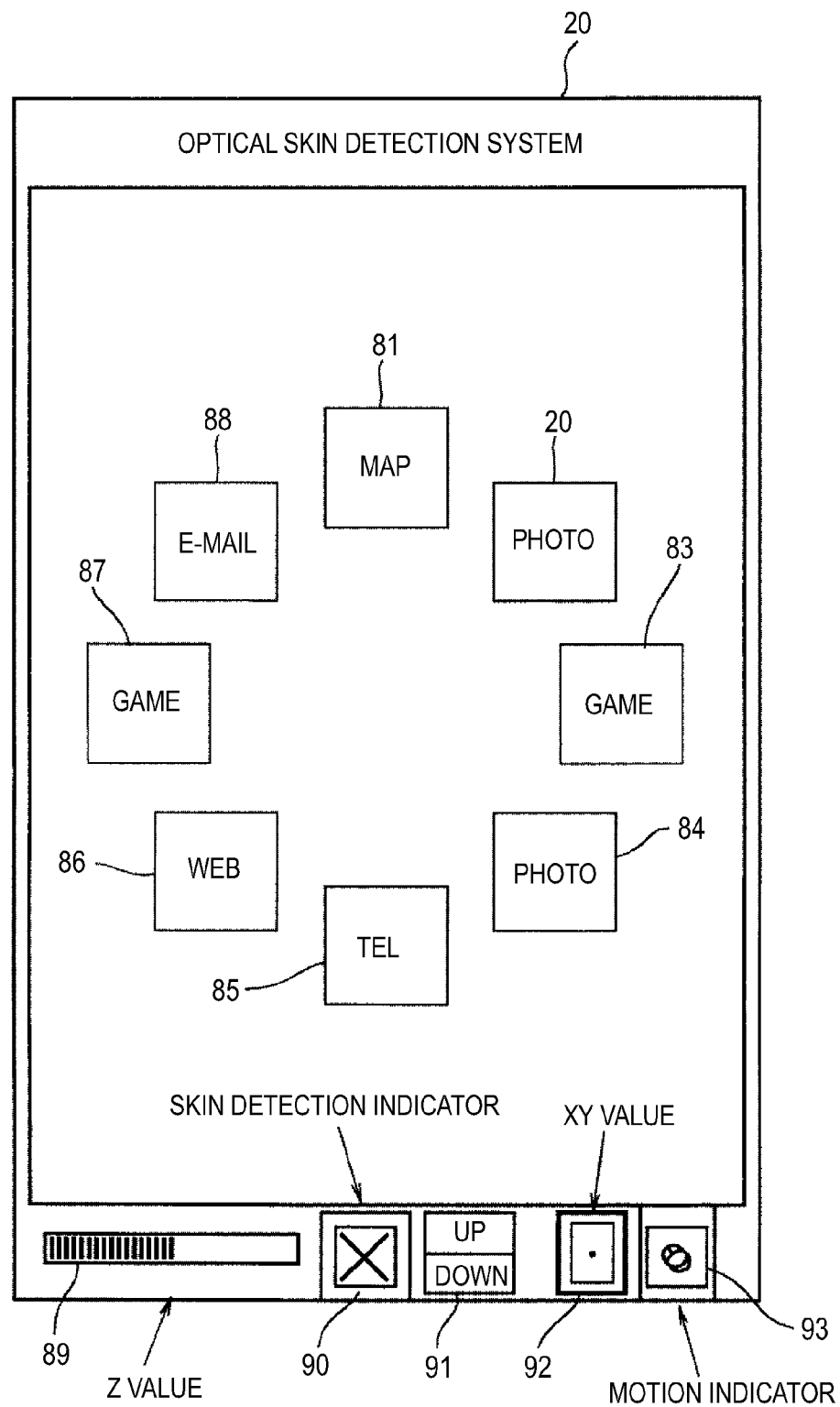
FIG. 13 is a first diagram illustrating a tutorial mode.

Next, FIG. 13 shows an example of the tutorial mode.

In FIG. 13, on the display screen of the display unit 20, icon display regions displaying circularly arranged icons 81 to 88 are provided, and state display regions displaying a movement of the hand of a user, detection situations of a skin region, and the like are provided in the lower side of the icons 81 to 88.

The state display regions include a Z value display region 89 displaying a z value of the three-dimensional position (x, y, z)t, a skin detection display region 90 displaying a detection result of a skin region, an up and down display region 91 displaying in which direction the pointer 61 is moved of the up direction and the down direction, an xy value display region 92 displaying positions for an x value and an y value of the three-dimensional position (x, y, z)t, and an operation display region 93 displaying an operation state of the pointer 61.

The Z value display region 89 is a region for displaying a z value of the three-dimensional position (x, y, z)t. Specifically, for example, as shown in FIG. 13, the magnitude of a z value is displayed by an indicator which has the magnitude of a z value enabling the click action to be recognized as the maximum value.

The skin detection display region 90 is a region for displaying a detection result of a skin region. Specifically, for example, if the skin region is not detected, the skin detection display region 90 may display the cross mark as shown in FIG. 13, and if the skin region is detected, may display a hand-shaped mark.

Further, for example, if the skin region is detected, and according to a z value, a color of the hand-shaped mark may be changed. Specifically, for example, if z<Th1, a color of the hand-shaped mark may be changed to red, if Th1≤z≤Th2, a color of the hand-shaped mark may be changed to yellow, and if Th2≤z≤Th3, a color of the hand-shaped mark may be changed to green. In addition, for example, if the click action is detected, the skin detection display region 90 may display a mark indicating the detection of the click action.

The up and down display region 91 is a region for displaying a movement direction of the pointer 61. Specifically, for example, as shown in FIG. 13, the up and down display region 91 is a region displayed as "Up" and "Down". If the pointer 61 is moved upward, the region displayed as "Up" may be displayed so as to be emphasized, and if the pointer 61 is moved downward, the region displayed as "Down" may be displayed so as to be emphasized. A direction displayed as the movement direction of the pointer 61 is not limited to the up direction and the down direction.

The xy value display region 92 is a region for displaying positions for an x value and a y value of the three-dimensional position $(x, y, z)_t$. The xy value display region 92 displays an image obtained by, for example, reducing the entire display screen of the display unit 20, and displays a position (x, y) for an x value and a y value of the three-dimensional position $(x, y, z)_t$ in the image. In addition, the xy value display region 92 may display either an x value or a y value of the three-dimensional position $(x, y, z)_t$.

The operation display region 93 is a region for displaying an operation state of the pointer 61. Specifically, for example, if the pointer 61 is not moved, the operation display region 93 displays the mark as shown in FIG. 13, and if the pointer 61 is moved, displays a mark indicating that the pointer is moved.

In addition, if the pointer 61 is moved, instead of the mark indicating that the pointer 61 is moved, there may be a display of a mark (for example, displayed when the pointer mode process or the line mode process is executed) indicating that the movement (trajectory) of the pointer 61 is a movement in a straight line, or a mark (for example, displayed when the rotation mode process is executed) indicating that the pointer 61 is moved so as to draw a circle in the clockwise rotation or in the counterclockwise rotation.

As shown in FIG. 13, if the state display regions including the Z value display region 89 to the operation display region 93 are displayed on the display screen of the display unit 20 in response to the control from the mode processing unit 19, a user can operate the detection device 1 without the sense of discomfort even if the user is not used to the detection device 1 moving the pointer or the like through the movement of the hand of himself/herself.

There may be a configuration in which the state display regions including the Z value display region 89 to the operation display region 93 are displayed on the display screen of the display unit 20 until the user is used to operations by the detection device 1, and the state display regions stop being displayed after the user is used to the operations by the detection device 1. In addition, as well as displaying all of the Z value display region 89 to the operation display region 93 on the display screen of the display unit 20, at least one of the Z value display region 89 to the operation display region 93 may be displayed.

For example, the user movement information (for example, the movement distance Dxy, the movement distance Dz, the movement velocity Vxy, the curvature, or the like) is displayed on the display screen of the display unit 20, or the name or the like of a process set as a process to be executed may be displayed.

That is to say, any information may be displayed on the display screen of the display unit 20 as long as the information assists operations of the detection device 1 by a user who is not used to the operations when the user moves the hand so as to operate the detection device 1.

In addition, for example, the detection device 1 may be embedded in a recording and reproducing device which records or reproduces music or moving pictures. In this case, the recording and reproducing device in which the detection device 1 is embedded can perform reproduction or recording (audio recording, video recording, and the like) based on a three-dimensional position (x, y, z) of a user calculated by the embedded detection device 1.

Specifically, for example, if such a movement that the hand is moved from the left to the right is detected based on the three-dimensional position (x, y, z) of the user, fast-forward may be performed, and if such a movement that the hand is moved from the right to the left is detected, rewind may be performed.

Figure 14:
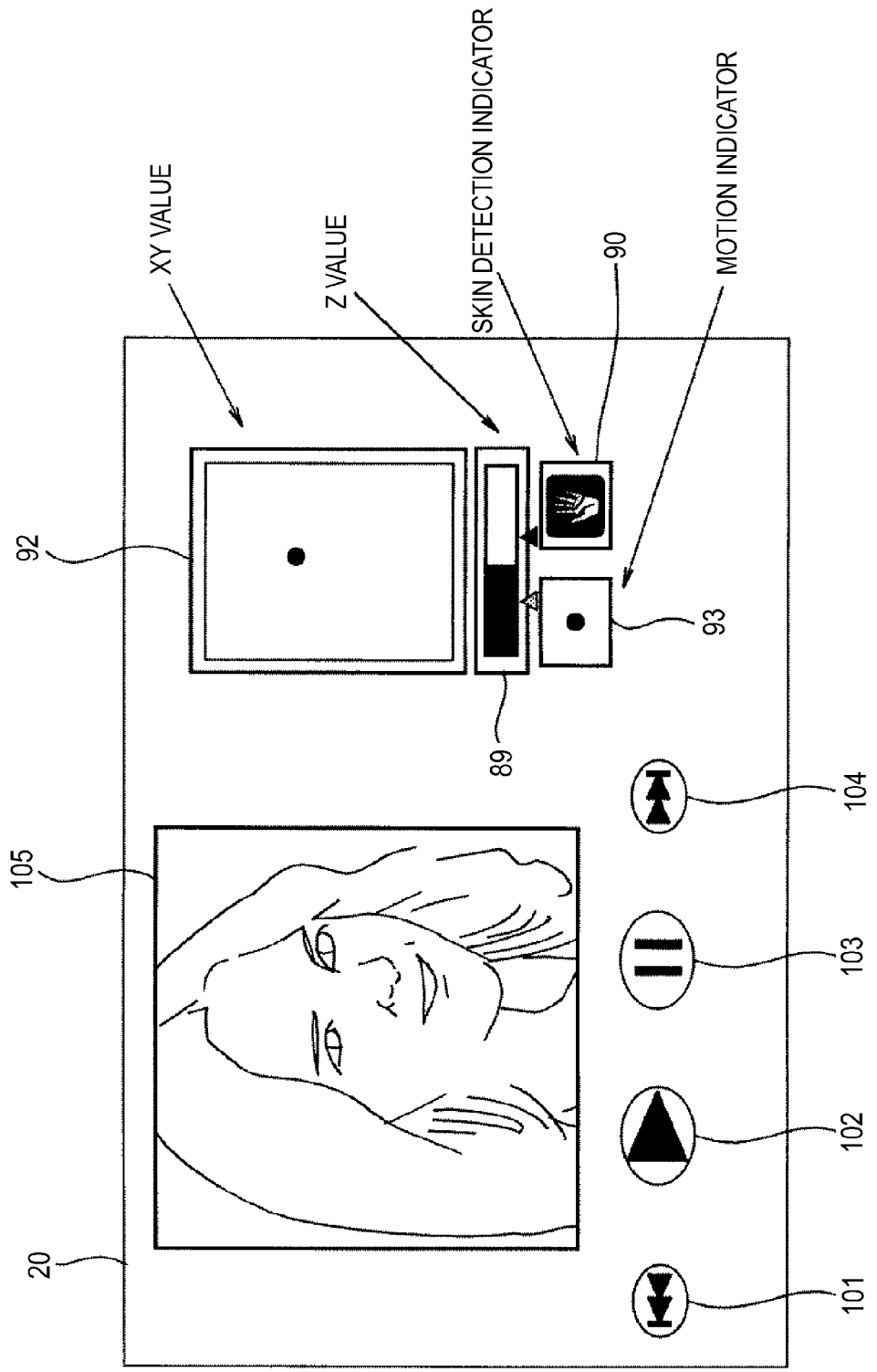
FIG. 14 is a second diagram illustrating the tutorial mode.

In a case where the detection device 1 is used to be embedded in the recording and reproducing device, for example, the image as shown in FIG. 14 is displayed on the display screen of the display unit 20 in the tutorial mode.

In addition, the display screen of the display unit 20 shown in FIG. 14 is the same as the case in FIG. 13 except that, instead of a plurality of icons 81 to 88, a rewind button 101 for rewinding music or moving pictures, a play button 102 for reproducing music or moving pictures, a stop button 103 for stopping music or moving pictures, a fast-forward button 104 for fast forwarding music or moving pictures, and a region 105 for displaying a singer of music during reproduction, or reproduced moving pictures, are provided.

2. Modified Example

In the embodiment, although the detection device 1 detects a skin region of a user, and calculates a three-dimensional position $(x, y, z)_t$ of the user based on the detected skin region, a calculation method of the three-dimensional position $(x, y, z)_t$ of the user is not limited thereto.

That is to say, for example, as the calculation method of the three-dimensional position $(x, y, z)_t$ of the user, a calculation method using a stereo camera process may be employed. In the stereo camera process, the three-dimensional position $(x, y, z)_t$ of the user is calculated based on parallax of the two cameras, using two captured images obtained by the two cameras.

In addition, for example, as a calculation method of calculating z of the three-dimensional position $(x, y, z)_t$ of the user, as well as calculating z based on the size of a skin region or a luminance value, z may be calculated using a Time-of-Flight range image sensor.

The Time-of-Flight range image sensor measures a time from when light such as infrared rays or the like is provided to a user until the provided light is reflected by the user and returns, and calculates a distance z to the user based on the measured time and the velocity of the provided light.

Meanwhile, the above-described series of processes may be executed by dedicated hardware or software. When a series of processes is executed by the software, programs constituting the software are installed from a recording medium to a so-called built-in computer, or, for example, a general personal computer which can execute various kinds of functions by installing various kinds of programs.

Configuration Example of Computer

Figure 15:
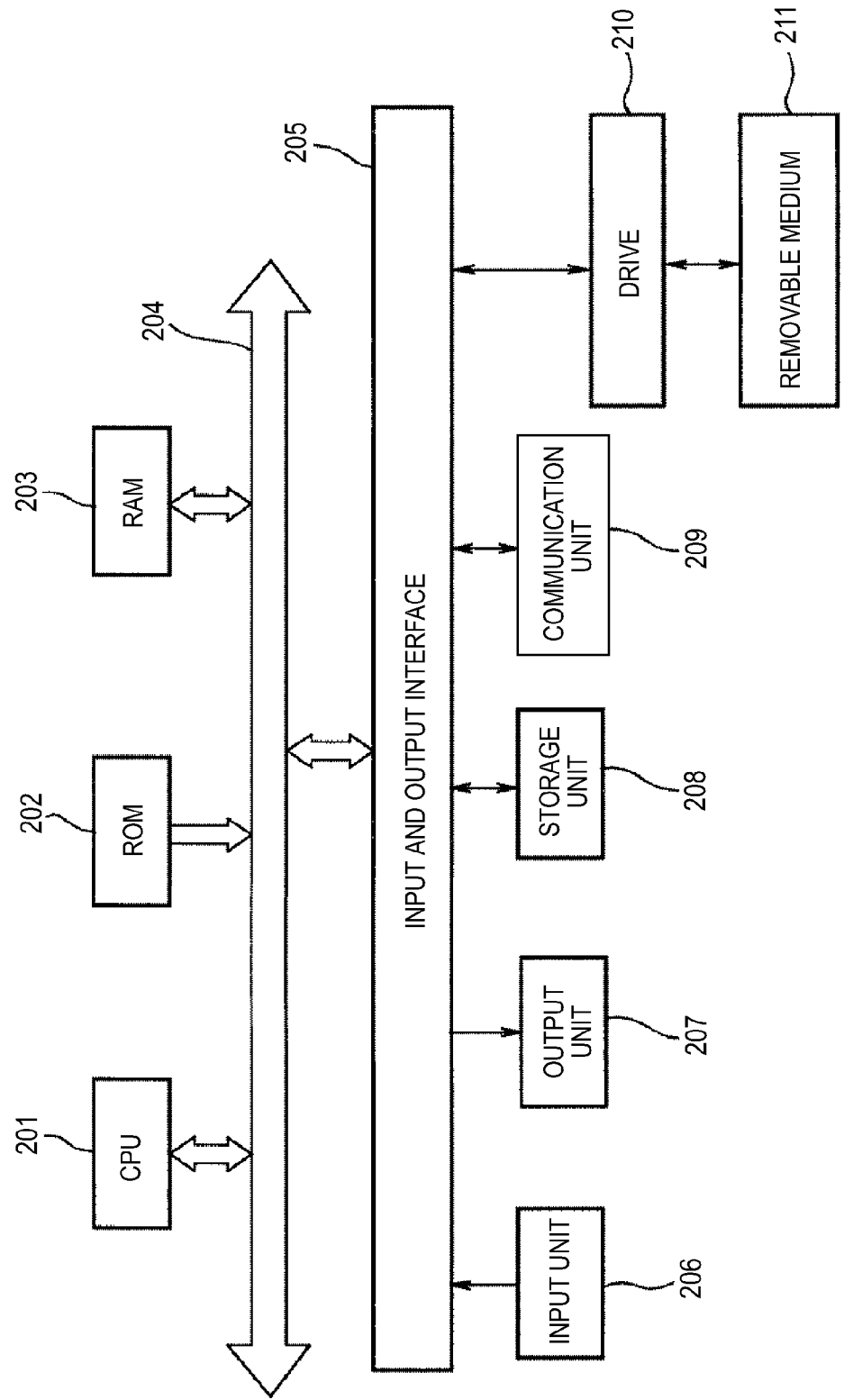
FIG. 15 is a block diagram illustrating a configuration example of a computer.

FIG. 15 is a block diagram illustrating a configuration example of a computer which executes the series of processes using a program.

A CPU (Central Processing Unit) 201 executes various kinds of processes according to a program stored in a ROM (Read Only Memory) 202 or a storage unit 208. A RAM (Random Access Memory) 203 appropriately stores programs or data executed by the CPU 201. The CPU 201, the ROM 202, and the RAM 203 are connected to each other via a bus 204.

The CPU 201 is connected to an input and output interface 205 via the bus 204. The input and output interface 205 is connected to an input unit 206 constituted by a keyboard, a mouse, or the like, and an output unit 207 constituted by a display, a speaker, and the like. The CPU 201 executes various kinds of processes in response to commands input from the input unit 206. The CPU 201 outputs a processed result to the output unit 207.

The storage unit 208 connected to the input and output interface 205 includes, for example, a hard disk, and stores programs or various kinds of data executed by the CPU 201. A communication unit 209 communicates with external devices via a network such as the Internet or LAN.

A program may be obtained via the communication unit 209 and stored in the storage unit 208.

A drive 210 connected to the input and output interface 205 drives a removable medium 211 such as a magnetic disk, an optical disc, a magneto-optical disc, or a semiconductor memory, which is installed, and obtains programs, data, or the like recorded thereon. The obtained programs or data are transmitted to and stored in the storage unit 208 as necessary.

Recording media recording programs which can be installed in a computer and be executed by the computer, include, as shown in FIG. 15, magnetic disks (including flexible disks), optical discs (including CD-ROMs (Compact Disc-Read Only Memories) and DVDs (Digital Versatile Discs)), magneto-optical discs (including MDs (Mini-Discs)), or the removable media 211 which are package media constituted by semiconductor memories or the like, or hard disks constituting the ROM 202 or the storage unit 208 which stores programs temporarily or permanently. Programs are optionally recorded in the recording media using a wired or wireless communication medium such as a LAN, the Internet, or digital satellite broadcasting, via the communication unit 209 which is an interface such as a router or a modem as necessary.

Further, in this specification, the steps for describing programs recorded in a recording medium include not only processes performed in a time series according to the described order, but also processes executed in parallel or separately even if not necessarily performed in the time series.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An information processing device comprising:
    a user position detection unit that detects a user position (x, y, z) indicating a position of a user indicated by a plurality of values on different coordinate axes;
    a calculation unit that calculates user movement information indicating a movement of the user based on a coordinate point defined by a value on at least one axis among the plurality of values on coordinate axes indicating the user position (x, y, z);
    a setting unit configured to
        set a process to be executed among a plurality of processes performed according to the movement of the user based on the calculated user movement information; and
    an execution unit that configured to execute the set process,
    wherein the user position detection unit is configured to:
        determine a distance between the user position (x, y, z) and a reference distance (z0) along a first axis (Z) relative to a focal distance to a condensing lens (f); and
        normalize the user position (x, y, z) and the user movement information for a second axis (X) and a third axis (Y) proportionally to the determined distance between the user position (x, y, z) and the reference distance (z0) in the first axis (Z) such that the normalized user position (x', y', z0) is equal to:

$$x'=\{(z-f)*x\}/(z0-f) \text{ and } y'=\{(z-f)*y\}/(z0-f).$$

2. The information processing device according to claim 1, wherein the calculation unit calculates at least one of a movement quantity of the coordinate point within a predetermined time, a movement direction of the coordinate point, a movement velocity of the coordinate point, and a curvature of a trajectory drawn by the coordinate point, as the user movement information.

3. The information processing device according to claim 2, further comprising:
    a first irradiation unit that irradiates the user with light of a first wavelength;
    a second irradiation unit that irradiates the user with light of a second wavelength longer than the first wavelength;
    a captured image generation unit that generates a first image based on reflection light from the user, incident when the light of the first wavelength is applied, and generates a second image based on reflection light from the user, incident when the light of the second wavelength is applied; and
    a skin region detection unit that detects a skin region indicating skin of the user based on the generated first and second images,
    wherein the user position detection unit detects the user position based on the skin region.

4. The information processing device according to claim 3, further comprising a display control unit that displays a pointer which is moved according to a movement of the user.

5. The information processing device according to claim 4, wherein the display control unit displays at least one of the user movement information, a process set by the setting unit, a detection result by the user position detection unit, a detection result by the skin region detection unit, and pointer movement information indicating a movement of the pointer.

6. The information processing device according to claim 5, wherein the display control unit displays at least one of the plurality of values on coordinate axes indicating the detected user position, as the detection result by the user position detection unit.

7. The information processing device according to claim 5, wherein the display control unit displays at least one of information indicating a direction in which the pointer is moved, and information indicating a trajectory of the pointer, as the pointer movement information.

8. The information processing device according to claim 2, further comprising a data determination unit that determines whether or not the detected user position is abnormal data, wherein the calculation unit calculates the user movement information based on a coordinate point defined by a value on at least one axis among the plurality of values on coordinate axes indicating the user position which is determined as not being abnormal data among a plurality of detected user positions.

9. The information processing device according to claim 1, wherein the user position detection unit detects a three-dimensional position indicated by values on three different coordinate axes as the user position, and wherein the calculation unit
calculates first user movement information based on a first coordinate point defined by values on two coordinate axes of the three coordinate axes, and
calculates second user movement information different from the first user movement information based on a second coordinate point defined by a value on the remaining coordinate axis of the three coordinate axes.

10. The information processing device according to claim 1, wherein the setting unit is configured to:
determine the first axis corresponds to greater movement and the second axis corresponds to lesser movement among the user movement information; and
set the process, corresponding to the first axis with the greater movement, to be executed among a plurality of processes performed according to a movement of the user based on the calculated user movement information such that at least one of the plurality of processes corresponding to the second axis with the lesser movement is prevented, and
wherein the setting unit sets, as a process to be executed according to a movement of the user, one of
a pointer mode process of moving a pointer displayed on a display unit,
a click mode process of detecting a click operation by which the user instructs selection or execution,
a rotation mode process of performing a process corresponding to a circular trajectory so as to correspond to a movement of the pointer which draws the circular trajectory, and
a line mode process of performing a process corresponding to a linear trajectory so as to correspond to a movement of the pointer which draws the linear trajectory.

11. The information processing device according to claim 10, wherein the greater movement is linear and the lesser movement is linear.

12. The information processing device according to claim 1, wherein normalizing the user position and the user movement information based on the determined distance between the user position and the reference distance includes converting the user movement information to scaled user movement information at the reference distance.

13. An information processing method of an information processing device which executes a process according to a movement of a user, the information processing device including a user position detection unit, a calculation unit, a setting unit, and an execution unit, the method comprising:
causing the user position detection unit to detect a user position (x, y, z) indicating a position of a user indicated by a plurality of values on different coordinate axes;
causing the calculation unit to calculate user movement information indicating a movement of the user based on a coordinate point defined by a value on at least one axis among the plurality of values on coordinate axes indicating the user position (x, y, z);
causing the setting unit to:
determine a first axis with greater movement and a second axis with lesser movement among the user movement information, and
set a process, corresponding to the first axis with the greater movement, to be executed among a plurality of processes performed according to the movement of the user based on the calculated user movement information, wherein at least one of the plurality of processes corresponding to the second axis with the lesser movement is prevented; and
causing the execution unit to execute the set process without executing the prevented process,
wherein the user position detection unit is caused to:
determine a distance between the user position (x, y, z) and a reference distance (z0) along the first axis (Z) relative to a focal distance to a condensing lens (f); and
normalize the user position (x, y, z) and the user movement information for the second axis (X) and a third axis (Y) proportionally to the determined distance between the user position (x, y, z) and the reference distance (z0) in the first axis (Z) such that the normalized user position (x', y', z0) is equal to:

$$x'=\{(z-f)*x\}/(z0-f) \text{ and } y'=\{(z-f)*y\}/(z0-f).$$

14. A non-transitory computer readable medium storing a program enabling a computer to function as:
a user position detection unit that detects a user position (x, y, z) indicating a position of a user indicated by a plurality of values on different coordinate axes;
a calculation unit that calculates user movement information indicating a movement of the user based on a coordinate point defined by a value on at least one axis among the plurality of values on coordinate axes indicating the user position (x, y, z);
a setting unit that:
determines a first axis with greater movement and a second axis with lesser movement among the user movement information, and
sets a process, corresponding to the first axis with the greater movement, to be executed among a plurality of processes performed according to a movement of the user based on the calculated user movement information, wherein at least one of the plurality of processes corresponding to the second axis with the lesser movement is prevented; and
an execution unit that executes the set process without executing the prevented process,
wherein the user position detection unit is configured to:
determine a distance between the user position (x, y, z) and a reference distance (z0) along the first axis (Z) relative to a focal distance to a condensing lens (f); and
normalize the user position (x, y, z) and the user movement information for the second axis (X) and a third axis (Y) proportionally to the determined distance between the user position (x, y, z) and the reference distance (z0) in the first axis (Z) such that the normalized user position (x', y', z0) is equal to:

$$x'=\{(z-f)*x\}/(z0-f) \text{ and } y'=\{(z-f)*y\}/(z0-f).$$

15. An information processing device comprising:
a user position detection unit configured to:
- detect a three-dimensional user position corresponding an X-position, a Y-position, and a Z-position relative to a distance of the user position from a condensing lens of an imaging unit (f),
- determine a distance between the Z-position and a reference distance (z0) relative to the distance of the user position from the condensing lens (f), and
- normalize the user position and user movement information for the X-position and the Y-position proportionally to the determined distance between the Z-position and the reference distance (z0) relative to the distance of the user position from the condensing lens (f) such that the normalized user position (x', y', z0) is equal to $x'=\{(z-f)*x\}/(z0-f)$ and $y'=\{(z-f)*y\}/(z0-f)$;

a calculation unit configured to calculate the user movement information indicating a movement of the user from the three-dimensional user position; and a display control unit configured to display a pointer that is displayed and moved according to the normalized user position (x', y', z0) and the normalized user movement information.

* * * * *